United States Patent
Yeazel et al.

(10) Patent No.: US 8,307,856 B2
(45) Date of Patent: *Nov. 13, 2012

(54) DOUBLE BLOCK AND BLEED PLUG

(75) Inventors: Kenneth L. Yeazel, Tulsa, OK (US); Gregory L. Puckett, Broken Arrow, OK (US); Richard L. Goswick, Tulsa, OK (US)

(73) Assignee: TDW Delaware Inc., Wilmington, DE (US)

(*) Notice: Subject to any disclaimer, the term of this patent is extended or adjusted under 35 U.S.C. 154(b) by 450 days.

This patent is subject to a terminal disclaimer.

(21) Appl. No.: 12/256,150

(22) Filed: Oct. 22, 2008

(65) Prior Publication Data

US 2009/0114302 A1 May 7, 2009

Related U.S. Application Data

(63) Continuation-in-part of application No. 11/936,182, filed on Nov. 7, 2007.

(51) Int. Cl.
*F16L 55/10* (2006.01)
(52) U.S. Cl. ............... 138/93; 138/90; 138/92; 138/94
(58) Field of Classification Search ............ 138/89, 138/90, 92, 93, 94
See application file for complete search history.

(56) References Cited

U.S. PATENT DOCUMENTS

| | | |
|---|---|---|
| 386,446 A | 7/1888 | Bailey |
| 411,978 A | 10/1889 | Chisholm |
| 1,181,984 A | 5/1916 | Arni |
| 1,221,733 A | 4/1917 | Henderson |
| 2,177,916 A * | 10/1939 | Thomas et al. ............ 138/90 |
| 2,279,257 A | 4/1942 | Svirsky |
| 2,299,434 A * | 10/1942 | Svirsky ..................... 138/90 |
| 2,812,778 A | 11/1957 | Ver Nooy |
| 2,886,068 A | 5/1959 | Ver Nooy |
| 2,906,295 A | 9/1959 | Ver Nooy |

(Continued)

FOREIGN PATENT DOCUMENTS

EP    0 488 966 A1    6/1992

(Continued)

OTHER PUBLICATIONS

International Search Report and Written Opinion issued by the International Searching Authority (ISA/US) on May 28, 2009 in PCT/US09/38272 (11 pgs).

(Continued)

*Primary Examiner* — James F Hook
(74) *Attorney, Agent, or Firm* — Gable Gotwals

(57) ABSTRACT

A pipe plug includes two or more pivotally connected plugging heads that work in combination to double block and bleed a pipe. At least one of the plugging heads has an expandable sealing element that is in communication with an inflation source. The sealing element may be an inflatable sealing element or a compression packer sealing element. A passageway—sections of which may pass through the pivotal connection and into the plugging head—carries the inflation medium from the source to the sealing element. A bleed port passageway is also provided that passes through the plugging head. The leading plugging head may include a cleaning element for sweeping away debris ahead of the plug. The plugging heads may also include a skid plate that slideably engages the interior surface of the pipe to properly orient the plugging heads within the pipe.

29 Claims, 22 Drawing Sheets

U.S. PATENT DOCUMENTS

| | | | |
|---|---|---|---|
| 3,154,106 A | | 10/1964 | Ver Nooy |
| 3,442,294 A | | 5/1969 | Bischoff et al. |
| 3,495,546 A | * | 2/1970 | Brown et al. .................. 104/155 |
| 3,626,475 A | | 12/1971 | Hicks |
| 3,665,966 A | | 5/1972 | Ver Nooy |
| 3,695,301 A | * | 10/1972 | Pittman ........................... 138/97 |
| 3,714,957 A | * | 2/1973 | Schoeffler ..................... 137/244 |
| 3,774,646 A | | 11/1973 | Smith |
| 3,774,647 A | | 11/1973 | Saha et al. |
| 3,835,889 A | * | 9/1974 | Hyde .............................. 138/93 |
| 3,842,864 A | * | 10/1974 | Riegel et al. ..................... 138/93 |
| 3,902,528 A | | 9/1975 | Tartabini et al. |
| 4,040,450 A | | 8/1977 | Boundy |
| 4,064,912 A | | 12/1977 | Petrone |
| 4,202,377 A | | 5/1980 | Harrison |
| 4,314,577 A | * | 2/1982 | Brister ........................... 137/13 |
| 4,422,477 A | | 12/1983 | Wittman et al. |
| 4,505,295 A | | 3/1985 | Quin et al. |
| 4,682,631 A | | 7/1987 | Wilger et al. |
| 5,029,614 A | | 7/1991 | Lara et al. |
| 5,082,026 A | | 1/1992 | Smith |
| 5,156,042 A | | 10/1992 | Carlin et al. |
| 5,293,905 A | | 3/1994 | Friedrich |
| 5,297,581 A | | 3/1994 | Godfrey |
| 5,372,162 A | * | 12/1994 | Frey ................................ 138/98 |
| 5,844,127 A | | 12/1998 | Berube et al. |
| 6,062,262 A | | 5/2000 | Tash |
| 6,289,935 B1 | | 9/2001 | Tash |
| 6,601,437 B2 | | 8/2003 | Gotowick |
| 6,659,133 B2 | | 12/2003 | Russell |
| 7,240,697 B2 | | 7/2007 | Beebe et al. |
| 7,270,139 B2 | | 9/2007 | Calkins et al. |
| 7,281,543 B2 | | 10/2007 | Calkins et al. |
| 7,546,847 B2 | * | 6/2009 | Morrison et al. ............. 137/317 |
| 2002/0083988 A1 | * | 7/2002 | Lundman ........................ 138/91 |
| 2007/0018452 A1 | | 1/2007 | Lee |
| 2008/0017390 A1 | | 1/2008 | Bowie |

FOREIGN PATENT DOCUMENTS

WO     WO 2007/117154 A1     10/2007

OTHER PUBLICATIONS

International Search Report and Written Opinion (PCT/US08/81922); issued Jan. 21, 2009 by the International Search Authority (ISA/US); 10 pages.

International Preliminary Report on Patentability issued by the International Bureau, Geneva, Switzerland on May 5, 2011 in PCT/US2009/038272.

\* cited by examiner

DOUBLE BLOCK AND BLEED PLUG

REFERENCE TO PENDING APPLICATIONS

This application is a continuation-in-part of U.S. application Ser. No. 11/936,182, filed on Nov. 7, 2007, and claims priority to that U.S. application.

FIELD OF THE INVENTION

This invention relates generally to pipe plugs, particularly plugs for use in pipelines that carry high or low pressure fluids, high or low temperature fluids, steam, dangerous fluids, and environmentally hazardous fluids.

BACKGROUND OF THE INVENTION

"Double block and bleed" is a well-known term of art that refers to setting two seals in a pipe and opening a bleed port between the seals to ensure that the first seal is holding. Any leakage past the first seal is contained by the second seal and forced to exit through the bleed port. This arrangement ensures that the pipe is completely sealed, making it safe to work on downstream of the two seals.

Achieving double-block and bleed, however, currently requires the use of a single, metal-to-metal plugging seal or the use of two independent pluggers and fittings. Both approaches are expensive; use relatively large, heavy components; and require a lot of equipment to properly install. Additionally, the metal-to-metal plugging seal approach does not allow for bypassing pipeline product through a fitting. If a bypass is required, a second fitting must be installed upstream of the plugging seal. Therefore, a need exists for a double block and bleed plug that is less expensive, smaller and lighter weight, and easier to install than the current approaches. None of the prior art alone or in combination meets this need or renders the present invention obvious.

For additional information relating to pipe pluggers, reference may be had to the following previously issued United States patents.

| Patent Number | Inventor | Title |
|---|---|---|
| 386,446 | Bailey | Apparatus For Detecting Leaks In Soil and Other Pipes |
| 411,978 | Chisholm | Pipe Stopper |
| 1,181,984 | Arni | Test Plug |
| 1,221,733 | Henderson | Test Plug |
| 2,279,257 | Svirsky | Expansible Closure Means For Conduits |
| 2,812,778 | Ver Nooy | Pipe Line Plugger |
| 2,886,068 | Ver Nooy | Pipe Line Plugger |
| 2,906,295 | Ver Nooy | Pipe Line Plugger |
| 3,154,106 | Ver Nooy | Pipeline Plugger |
| 3,442,294 | Bischoff et al. | Closure Means For Use During Pressure Testing Of Pipes or The Like |
| 3,665,966 | Ver Nooy | Pipe Plugger |
| 3,774,646 | Smith | Line Stopping Assembly Using An Inflatable Element |
| 3,774,647 | Saha et al. | Line Stopping Assembly Using An Inflatable Element |
| 3,902,528 | Tartabini et al. | Pneumatic Plug For Hydraulic Conduits |
| 4,040,450 | Boundy | Pipe Sealing Apparatus |
| 4,064,912 | Petrone | Gas Main Stopper |
| 4,202,377 | Harrison | Pipe Cleaning and Plugging Apparatus |
| 4,505,295 | Quin et al. | Apparatus For Inserting A Shut-Off Device Laterally Into A Pipe |
| 4,682,631 | Wilger et al. | Sealing Apparatus For A Valve Body Opening |
| 5,029,614 | Lara et al. | Tandem Seal System For Testing Pipelines |
| 5,082,026 | Smith | Pipeline Plugger |
| 5,297,581 | Godfrey | Pipeline Plugger |
| 5,844,127 | Berube et al. | Apparatus For Isolating or Testing A Pipe Segment |
| 6,062,262 | Tash | Water Drain Pipe Test Plug Device |
| 6,289,935 | Tash | Drainpipe Test Plug Device |
| 6,601,437 | Gotowik | Apparatus For Testing or Isolating A Segment Of Pipe |
| 6,659,133 | Russell | Insertable Line Stopper Plug For Pipelines |
| 7,240,697 | Beebe et al. | Apparatus and Method For Isolating and Testing A Segment Of Pipelines |
| 7,270,139 | Calkins et al. | Cam-Assisted, Wedge Actuated, Metal-to-Metal Seal, Block and Bleed Plugging Tool |
| 7,281,543 | Calkins et al. | Apparatus, Systems and Methods for Plugging a High Temperature Pipe |
| 2007/0018452 | Lee | Pipe Interruption Fitting |
| 2008/0017390 | Bowie | Isolation Tool |
| EP 0488966 A1 | Ravetti | Stopper Device For Gas Tubes |
| WO2007/117154 | Aleksandersen et al. | Smartplug with Wheel Centralizer |

BRIEF SUMMARY OF THE INVENTION

The pipe plug according to this invention comprises one plugging head with a sealing element pivotally connected by a yoke to a carrier, and a second plugging head with a sealing element pivotally connected by a yoke to the first plugging head. When lowered through a lateral pipe access connection and placed in a final sealing position within a pipe, the first sealing element prevents flow of product in the pipe and the second sealing element captures any leakage past the first sealing element and forces that leakage out through a fitting. The fitting may be connected to a sleeve welded around the pipe and located downstream of the pipe access connection. The sleeve is required only if the stabilization pad forces on the pipe are excessive.

To help position each sealing element within the pipe, the pipe plug includes a set of wheels connected to each plugging head. Each wheel in the set of wheels impinges a portion of the pipe at some point during positioning of the pipe plug within the pipe, thereby causing the sealing elements to rotate into their final sealing position within the pipe. A stabilization pad, connected to a nose of each plugging head, prevents deformation of the sealing elements.

A spring-loaded pivot arm, pivot pin, and pivot wheel connected to the second plugging head allow the yoke that connects the two plugging heads to rotate freely into its proper position within a pipe. The pivot arm also has an outward-facing raised taper projection located behind the pivot wheel that helps prevent the pivot wheel from becoming entrapped in a pipe access connection when installing the pipe plug into the pipe or removing the pipe plug from the pipe. A guide wheel connected to the first plugging head helps prevent the first plugging head and the yoke connected to the carrier from becoming entrapped during the installation or removal process.

The pivotal arrangement of the plugging heads may be expanded to include a third plugging head. The third, or lead head, includes the pivot arm. All three plugging heads may include sealing elements. Alternatively, only the first and second plugging heads may have sealing elements with the third plugging head having a cleaning element such as a wire brush. The wire brush serves to sweep away debris ahead of the pipe plug.

The guide wheel connected to the first plugging head may be replaced by a skid plate that slideably engages the access connection and helps prevent the first plugging head and the yoke connected to the carrier from becoming entrapped during the installation or removal process. Similarly, the guide wheel on the second plugging head may be replaced by a skid plate that helps prevent entrapment and also slideably engages a portion of the pipe at some point during positioning of the pipe plug. Skid plates may also be used in place of guide wheels when three plugging heads are used.

The sealing elements used may be an expandable sealing element such as an inflatable sealing element or a compression packer sealing element. An inflation system supplies an inflation medium that travels along a passageway and inflates the expandable sealing element. A portion of the passageway is external to the plugging head and may be a tubing. Another portion of the passageway may be internal to the pipe plug, passing through parts of the carrier, yoke, and yoke pin (in the case of the first sealing element) and into the plugging head. The yoke pin may include an annular groove that provides continuity for the passageway as it exits the carrier and enters the yoke. A similar passageway may also be provided to inflate a second or third expandable sealing element. A third passageway—which may also pass through the carrier, yoke, and yoke pin—provides a bleed port for any leakage past the first inflatable sealing element.

A better understanding of the invention will be obtained from the following detailed description of the preferred embodiments taken in conjunction with the drawings and the attached claims.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENTS

It is to be understood that the invention that is now to be described is not limited in its application to the details of the construction and arrangement of the parts illustrated in the accompanying drawings. The invention is capable of other embodiments and of being practiced or carried out in a variety of ways. The phraseology and terminology employed herein are for purposes of description and not limitation.

Elements shown by the drawings are identified by the following numbers:

| | |
|---|---|
| 10 | Pipe Plug |
| 12 | Carrier |
| 13 | Plug |
| 14 | Yoke |
| 15 | End Plate |
| 16 | Yoke Pin |
| 17 | Annular Groove |
| 18 | Yoke Mount |
| 19 | O-Ring |
| 20 | Plugging Head |
| 21 | Plugging Head |
| 22 | Sealing Element |
| 23 | Sealing Element |
| 24 | Mounting Plate |
| 25 | Inlet |
| 26 | Nosepiece |
| 28 | Nose |
| 30 | Stabilization Pad |
| 32 | Wheel |
| 34 | Wheel |
| 36 | Guide Wheel |
| 37 | Skid Plate |
| 38 | Yoke |
| 39 | End Plate |
| 40 | Yoke Pin |
| 41 | Annular Groove |
| 43 | O-Ring |
| 45 | End Plate |
| 50 | Packer Seal |
| 51 | Piston Plate |
| 52 | Angled Surface |
| 53 | Angled Surface |
| 54 | Cylindrical Protrusion |
| 55 | O-Ring |
| 56 | O-Ring |
| 57 | O-Ring |
| 58 | O-Ring |
| 59 | Plug |
| 60 | Plugging Head |
| 62 | Sealing Element |
| 63 | Sealing Element |
| 64 | Mounting Plate |
| 65 | Inlet |
| 66 | Nosepiece |
| 68 | Nose |
| 70 | Stabilization Pad |
| 72 | Pivot Arm |
| 73 | Projection |
| 74 | Pivot Arm Wheel |
| 76 | Pivot Arm Pin |
| 78 | Spring |
| 80 | Pivot Arm Stop |
| 82 | Wheel |
| 84 | Wheel |
| 86 | Wheel |
| 87 | Skid Plate |
| 90 | Sleeve |
| 92 | Fitting |
| 94 | Port |
| 102 | Cleaning Element |
| 104 | Brush |
| 108 | External Port Fitting |
| 110 | Inflation System/Fluid Circuit |
| 112 | Inflation Source |
| 113 | Inflation Source |
| 114 | Tube Bundle |
| 115 | Valve |
| 116 | Valve |
| 117 | Valve |
| 118 | Valve |
| 119 | Valve |
| 120 | Inflation Passageway |
| 122 | Fitting |
| 124 | Elbow |
| 126 | Fitting |
| 128 | Lateral Run |
| 130 | Longitudinal Run |
| 141 | Annular Groove |
| 143 | O-Ring |
| 160 | Inflation Passageway |
| 162 | Fitting |
| 164 | Elbow |
| 166 | Fitting |
| 168 | Lateral Run |
| 170 | Lateral Run |
| 180 | Tee |
| 181 | Tee |
| 190 | Bleed Port Passageway |
| 192 | Fitting |
| 194 | Elbow |
| 196 | Fitting |
| 198 | Open End |
| 200 | Cylindrical Cavity |
| 205 | Bleed Fitting |
| 210 | Threaded Shaft |
| 220 | Cylindrical Protrusion |
| 225 | Anti-Rotation Pin |
| 230 | Piston Plate |
| 232 | Threaded Shaft |
| 234 | Cylindrical Projection |
| 235 | Cylindrical Cavity |
| 240 | Packer Seal |
| 242 | Angled Surface |
| 243 | Angled Surface |
| 244 | Anti-Extrusion Spring |
| 245 | Anti-Extrusion Spring |
| 246 | Anti-Extrusion Spring |
| 247 | Anti-Extrusion Spring |
| 250 | Yoke Arm |
| 255 | Yoke Arm |

Figure 1:
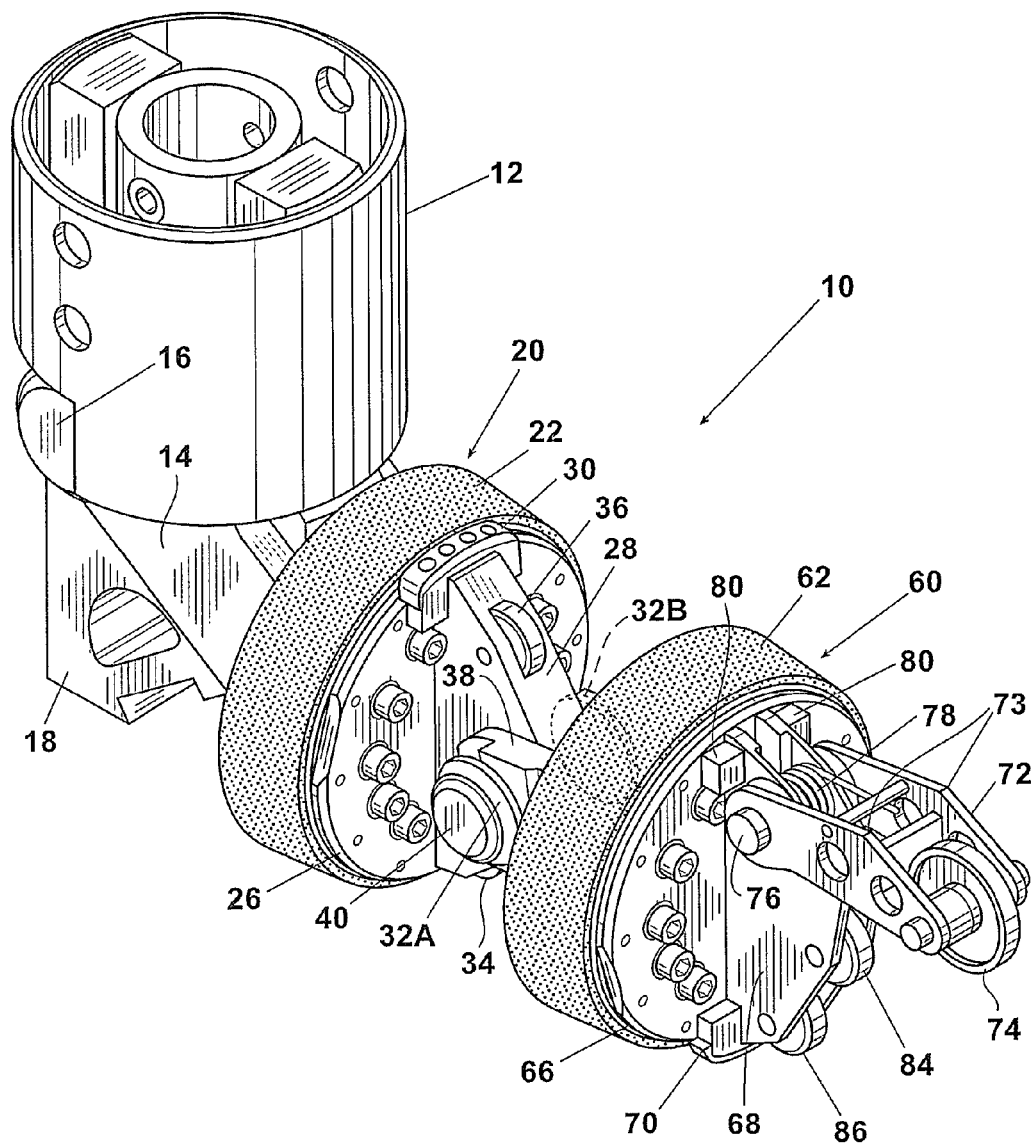
FIG. 1 is an isometric view of the pipe plug.
Figure 2:
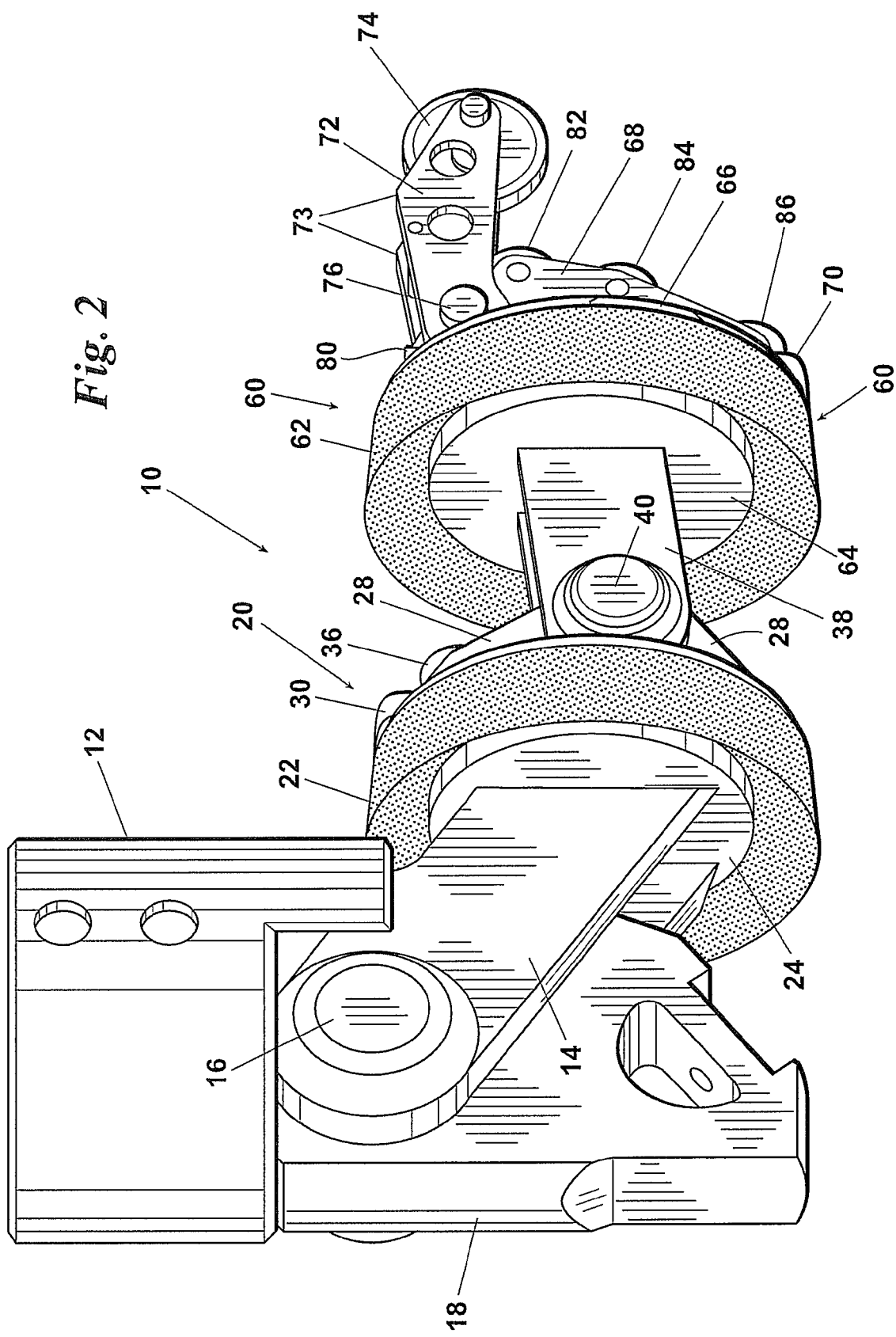
FIG. 2 is a reverse isometric view of the pipe plug.

Referring to the drawings and first to FIGS. 1 and 2, the pipe plug 10 comprises a plugging head 20 and a plugging head 60 that are pivotally connected to each other by a yoke 38 that rotates about a yoke pin 40. Plugging head 20, in turn, is pivotally connected to carrier 12 by yoke 14. Yoke 14 rotates about a yoke pin 16 contained within a yoke mount 18 connected to carrier 12. Carrier 12 is well-known in the art and is of the type of control bar head typically used to vertically lower, rotate, and position a plugging head within a pipe P for the purpose of temporarily blocking the pipe P. Similarly, plugging head 20 and plugging head 60 also are well-known in the art and are of the type typically used to temporarily block a pipe P.

Plugging head 20 includes a sealing element 22, a nosepiece 26 and a nose 28. A stabilization pad 30 mounts to nose 28 at a location substantially parallel to and offset from yoke pin 16. Stabilization pad 30 helps prevent deformation of sealing element 22 by countering the rotational moment generated by seal force about yoke pin 16. Nose 28 also includes a guide wheel 36 that helps prevent yoke 14 and plugging head 20 from becoming entrapped in the access connection to pipe P during their installation into and removal from the pipe P.

Plugging head 60 includes a sealing element 62, a nosepiece 66 and a nose 68. To ensure that yoke 38 rotates freely into its proper position within the pipe P, a pivot arm 72 is rotationally affixed to nose 68. The pivot arm 72 includes a pivot wheel 74, pivot arm pin 76, and spring 78. The spring 78, along with two pivot arm stops 80 mounted to nose 68, allows the pivot arm 72 to rotate outward and hold its position. Outward-facing projections 73 on the pivot arm 72 and located substantially right behind pivot arm wheel 74 help prevent the pivot arm wheel 74 from becoming entrapped in the access connection to pipe during installation of the second plugging head 60. A stabilization pad 70 mounts to nose 68 at a location substantially opposite that of pivot arm 72. Stabilization pad 70 helps prevent deformation of sealing element 62 by countering the rotational moment generated by seal force about yoke pin 40.

Figure 3:
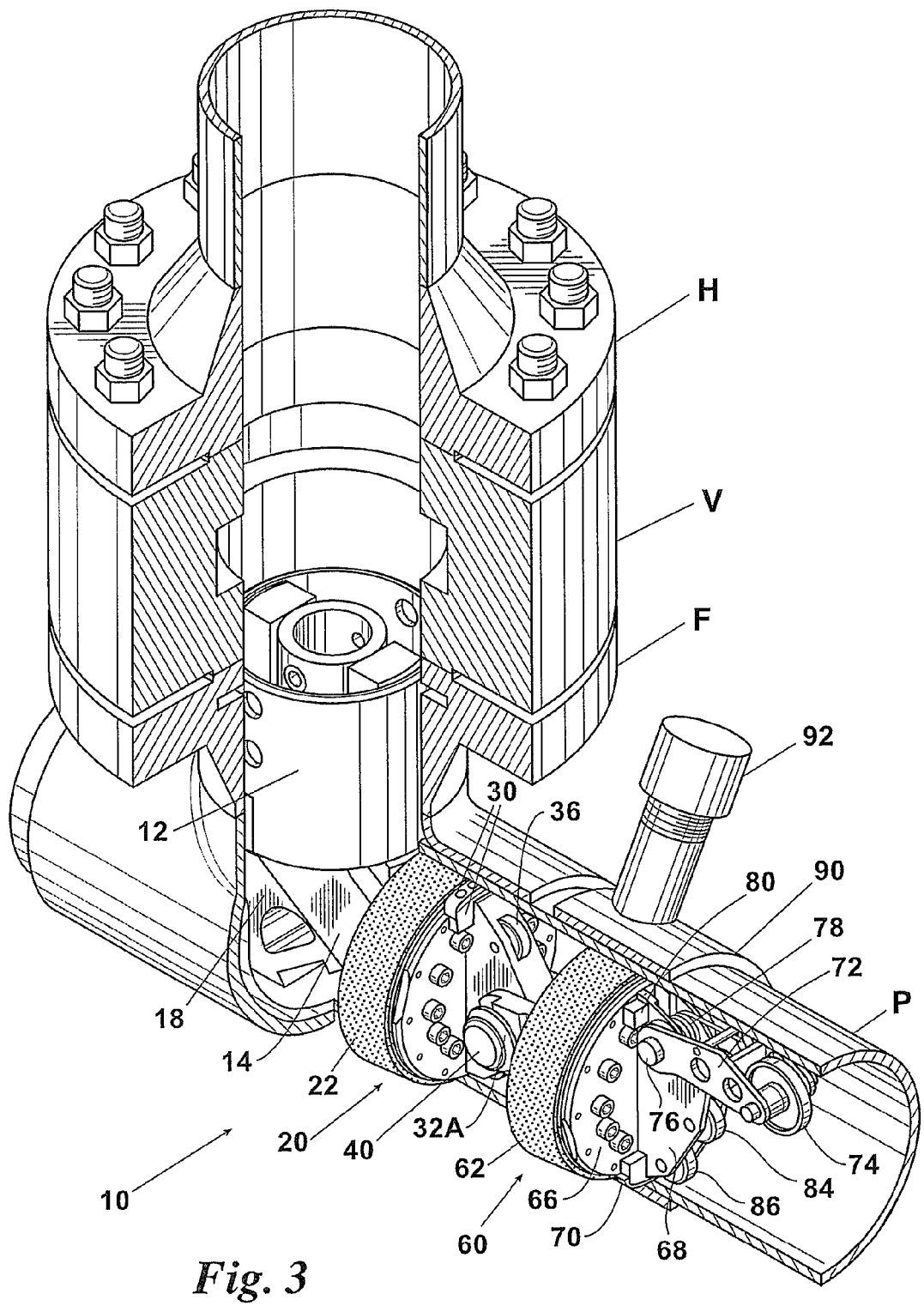
FIG. 3 is an isometric view of the pipe plug in its final sealing position within a pipe having a bleed port.
Figure 4:
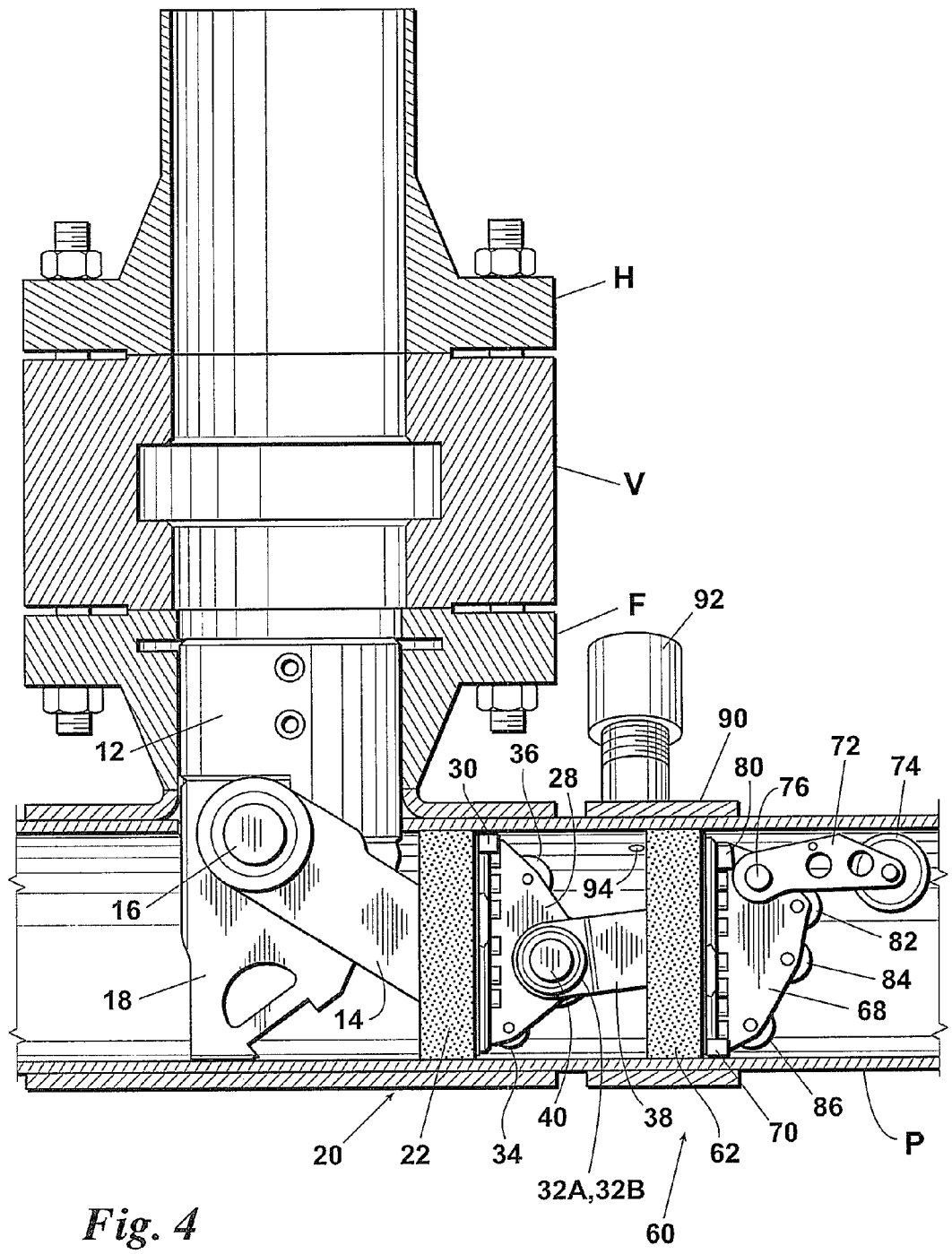
FIG. 4 is a view of the pipe plug in its final sealing position within a pipe.

Referring now to FIGS. 3 and 4, pipe plug 10 travels downwardly through an access connection—typically comprised of a housing H, sandwich valve V, and fitting F—until yoke mount 18 comes to rest on a bottom portion of the pipe P, with plugging head 20 and plugging head 60 substantially aligned with each other and sealing elements 22 and 62 in their final sealing position. When sealing element 22 is in its final sealing position, its outer surface of sealing element is engaged with the inner wall of pipe P and wheels 32A, 32B, and 34, as well as guide wheel 36, do not impinge on any portion of the pipe P. In this position, sealing element 22 prevents flow of product in the pipe P. When sealing element 62 is in its final sealing position, its outer surface is engaged with the inner wall of pipe P and wheels 82, 84, and 86 do not impinge on any portion of the pipe P. Pivot arm 72 and pivot arm wheel 74 are held in an outward-facing position against the pipe P by spring 78.

Sealing element 62 captures any leakage past sealing element 22 and forces that leakage out through a fitting 92. Fitting 92 may be connected to a sleeve 90 welded around the pipe and located downstream of the pipe P access connection. Fitting 92 is of the type well-known in the art to provide a bleed port.

Figure 5:
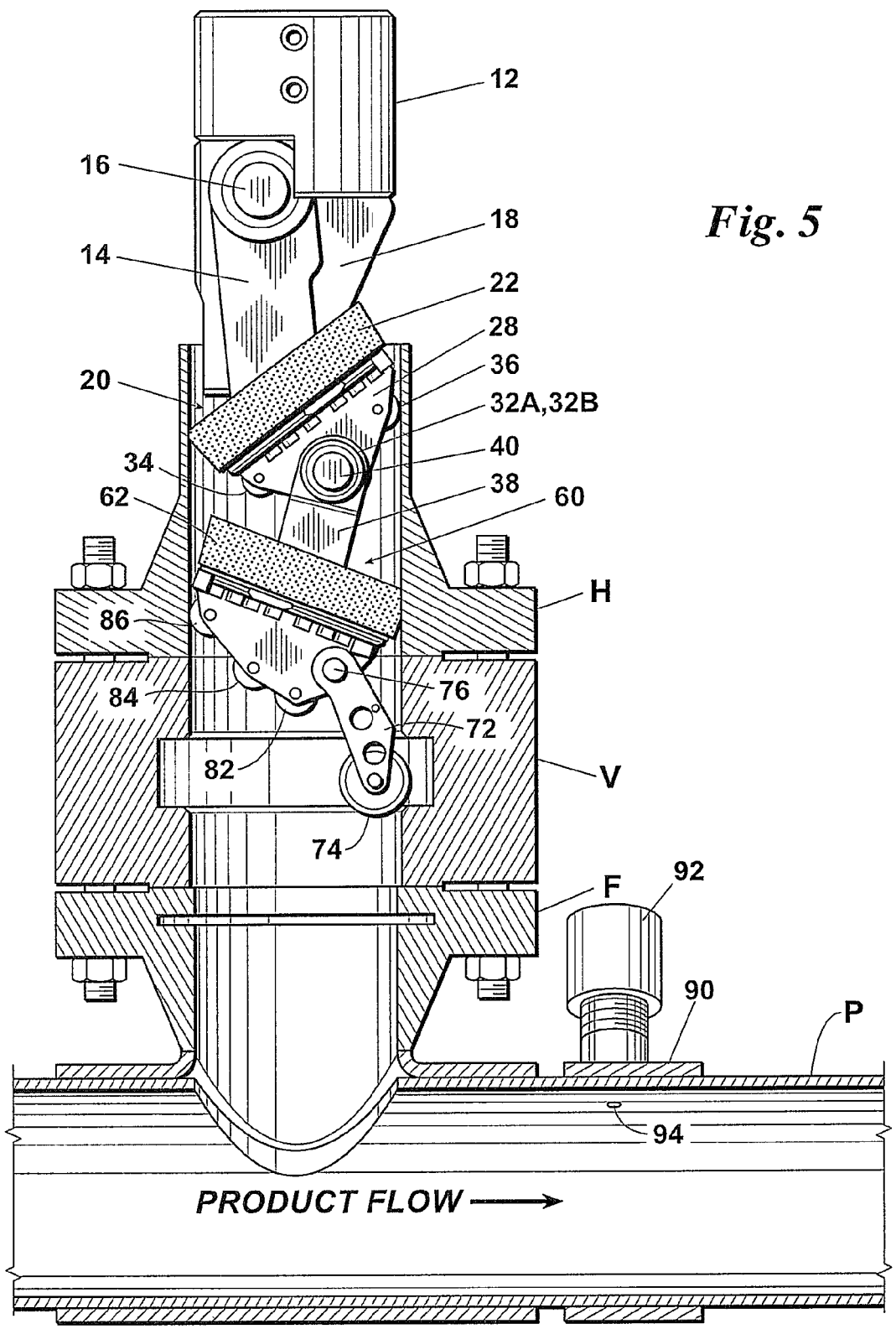
FIG. 5 is a view of the pipe plug as it is being lowered through a pipe access connection.
Figure 6:
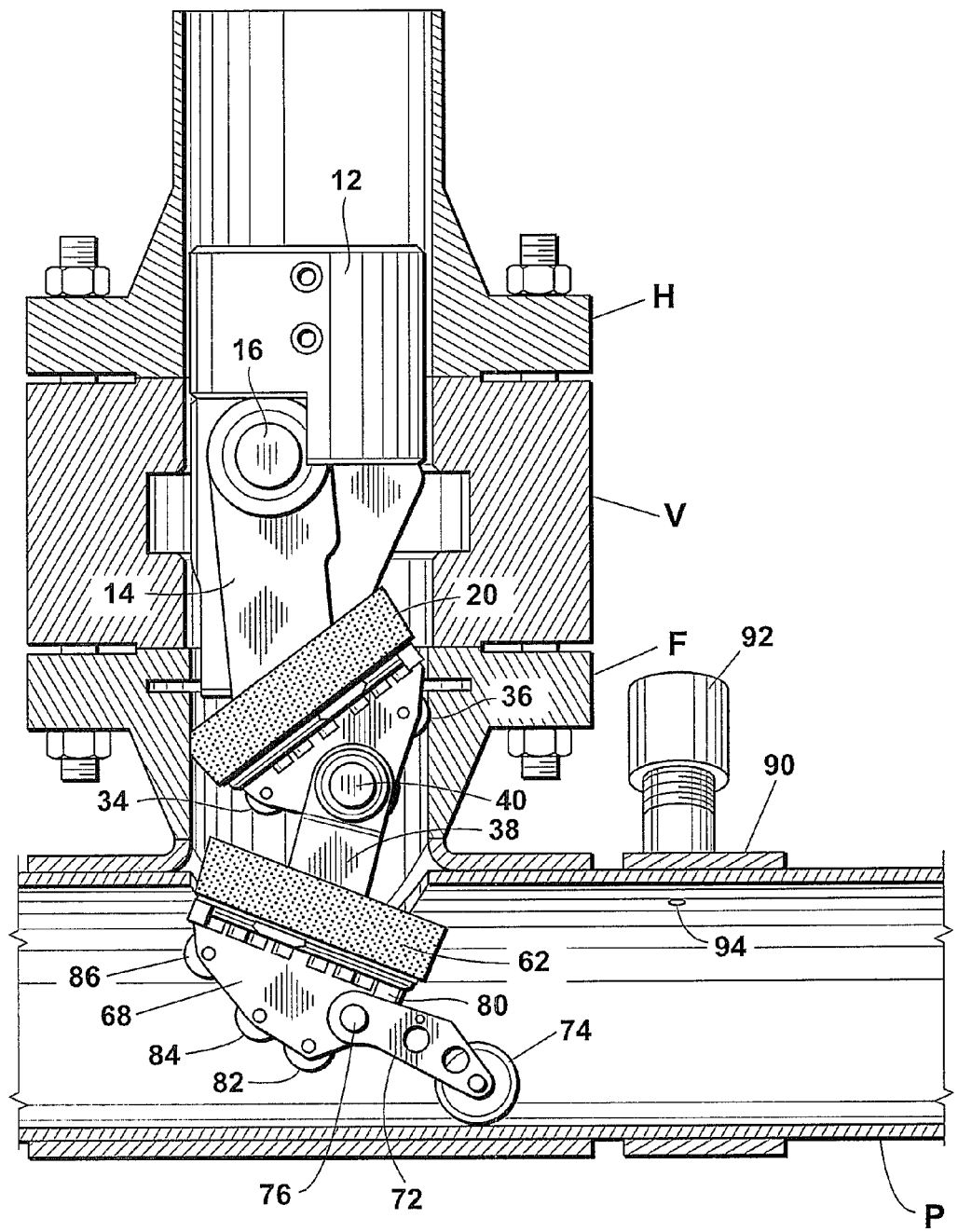
FIG. 6 is a view of the pipe plug as it begins its transition into the pipe.
Figure 7:
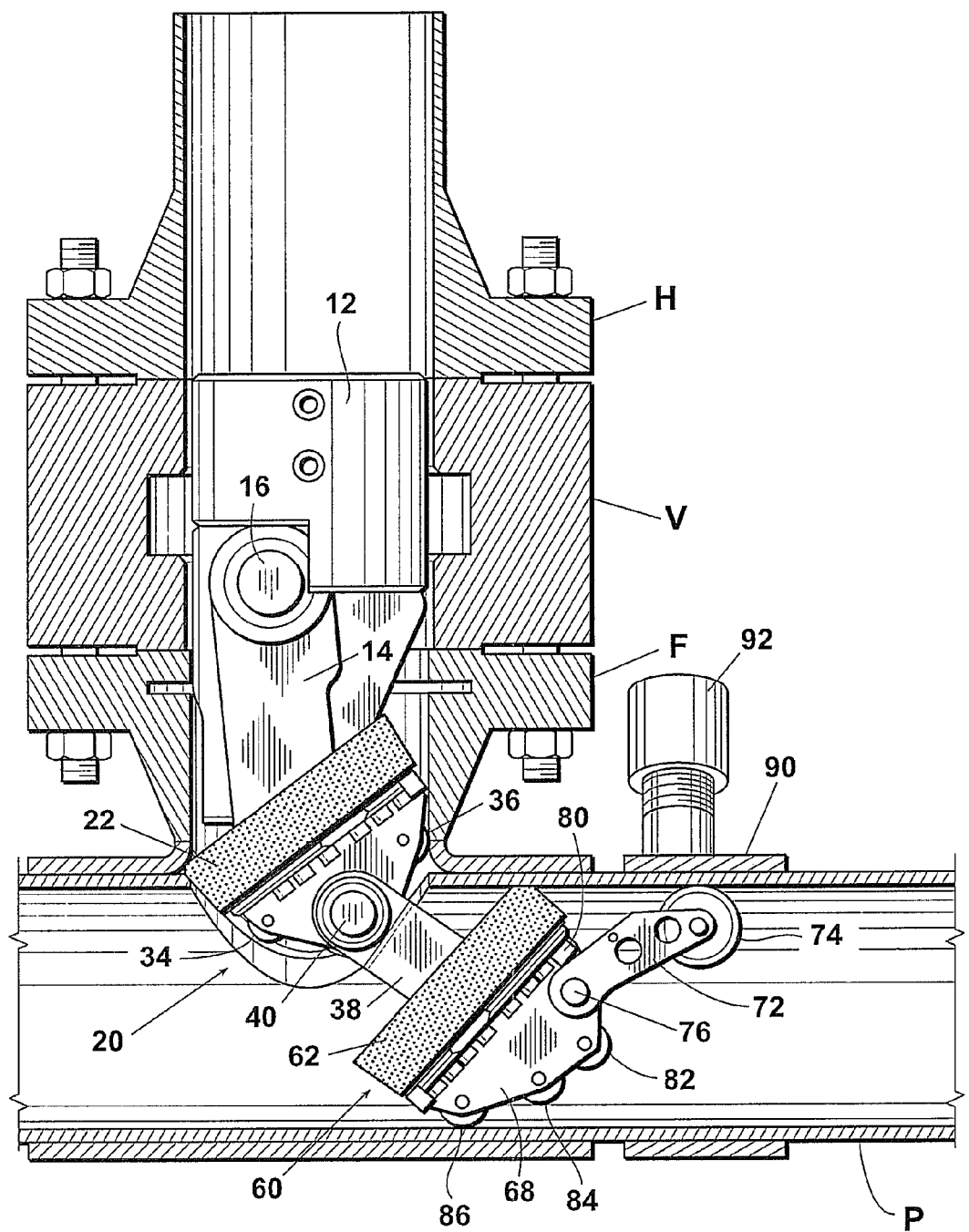
FIG. 7 is a view of the pipe plug as it travels along the pipe.
Figure 8:
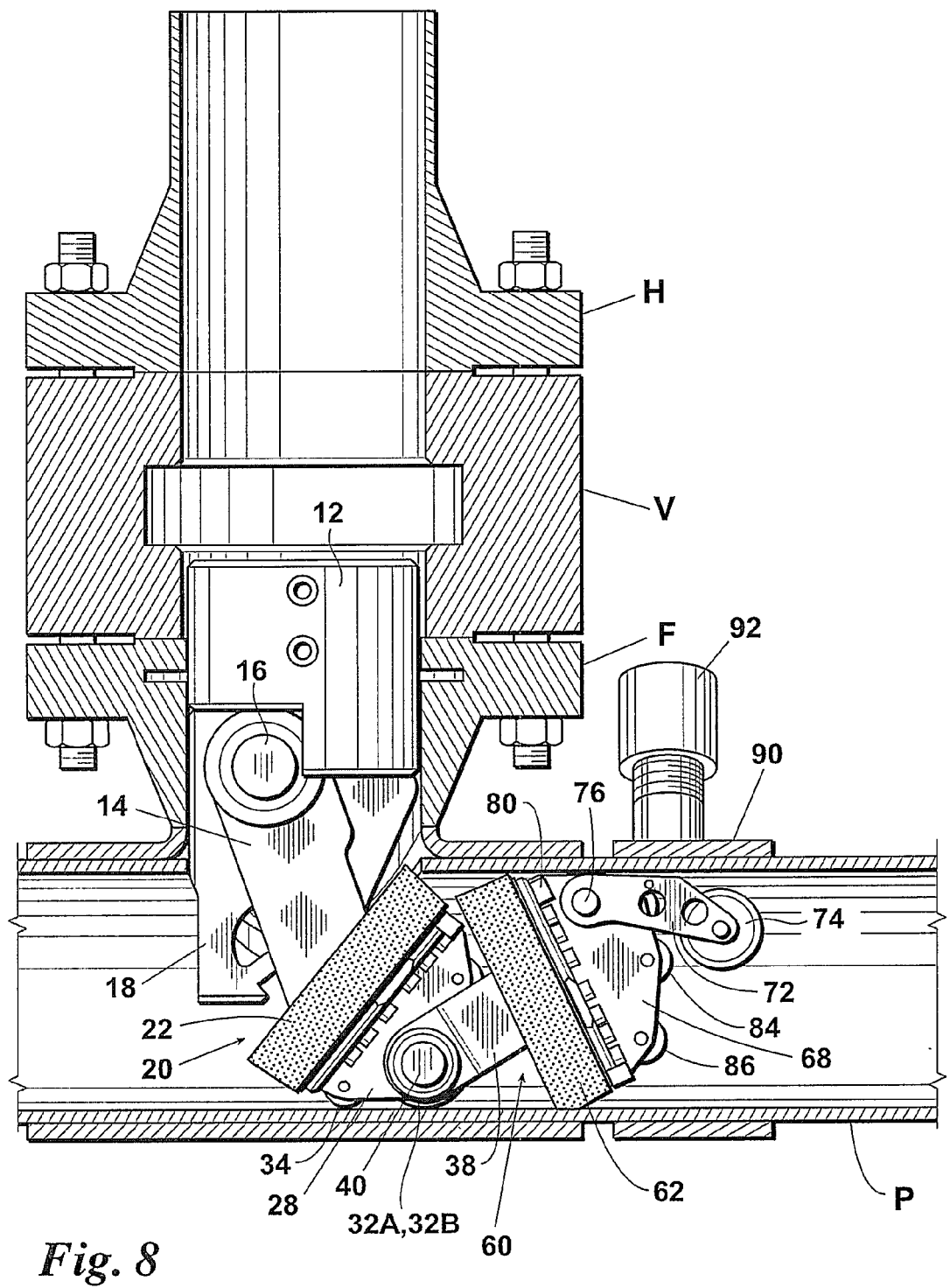
FIG. 8 is a view of the pipe plug as its plugging heads and their sealing elements begin to rotate into a final sealing position within the pipe.

As illustrated by FIGS. 5 and 6, pipe plug 10 travels downwardly through housing H, sandwich valve V, and fitting F, until pivot arm wheel 74 impinges on a bottom portion of pipe P, causing yoke 38 to begin rotation about yoke pin 40. As pipe plug 10 is further lowered into the fitting, yoke 38 continues to rotate about yoke pin 40 until wheel 82 impinges a bottom portion of pipe P. As illustrated by FIG. 7, the rotation of yoke 38 continues until wheel 84 and then wheel 86 impinge on a bottom portion of the pipe. As wheel 86 impinges on a bottom portion of the pipe P, plugging head 20 begins its entry into pipe P. As illustrated by FIGS. 7 and 8, at some point in this process of rotating plugging head 60, pivot arm wheel 74 impinges on a top portion of pipe P and causes pivot arm 72 to rotate out of the way.

Referring once again to FIG. 8, as plugging head 60 becomes substantially in alignment with the inside diameter of pipe P, pipe plug 10 continues its downward travel and plugging head 20 begins its transition into position within pipe P as wheels 32A and 32B impinge on a bottom portion of pipe P, causing yoke 14 to rotate about yoke pin 16. As yoke 14 continues to rotate, plugging head 20 becomes more substantially in alignment with the inside diameter of pipe P. Wheel 34 then impinges on a bottom portion of pipe P, causing yoke 14 to continue its rotation until sealing element 22 rotates into a final sealing position. When yoke mount 18 comes to rest on a bottom portion of pipe P, sealing elements 22 and 62 are in their final sealing positions (see FIGS. 3 and 4) and pipe plug 10 is stable and capable of resisting pipeline pressure loads.

Figure 9:
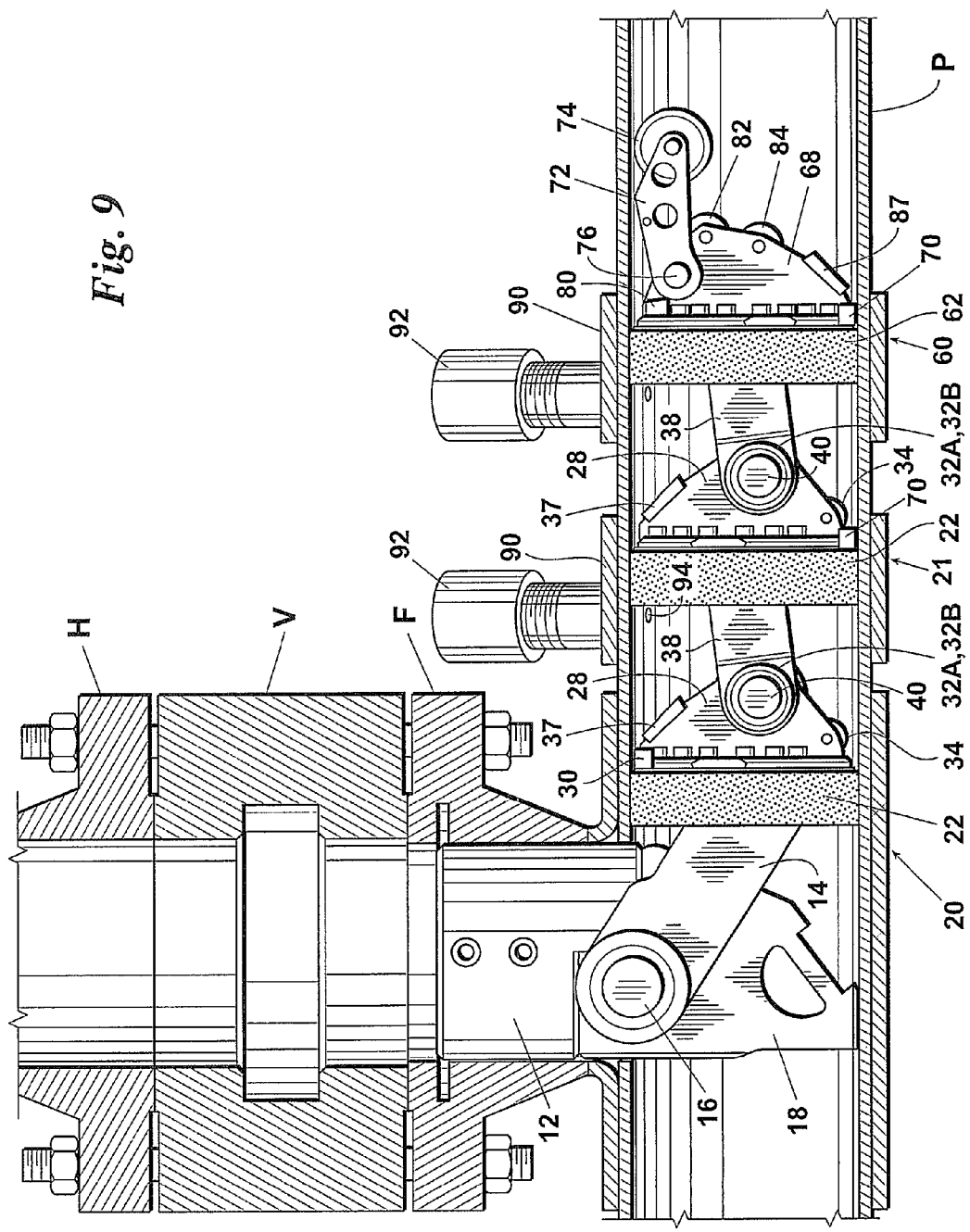
FIG. 9 is a view of the pipe plug with an additional plugging head and in its final sealing position within the pipe. A skid plate on each head helps prevent the yoke and head from becoming entrapped in the access connection to the pipe during installation and removal.
Figure 10:
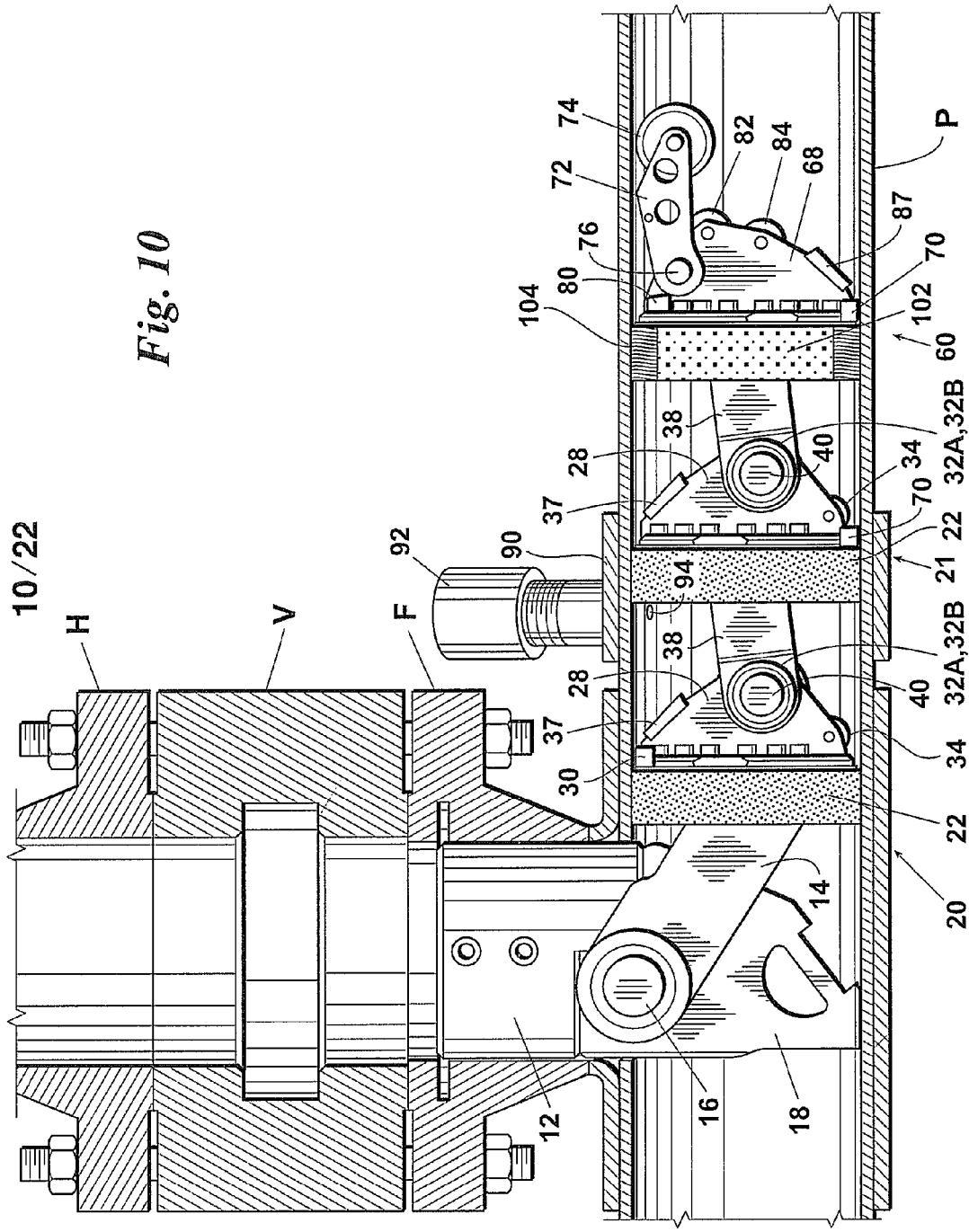
FIG. 10 is a view of the pipe plug with an additional head that includes wire brushes to sweep debris ahead of the plug.

FIGS. 9 and 10 illustrate other preferred embodiments of pipe plug 10. An additional plugging head 21 may be pivotally connected to first plugging head 20 with second plugging head 60 being pivotally connected to the additional plugging head 21. Second plugging head 60 may include a sealing element 62 or a cleaning element 102. Cleaning element 102 is preferably a wire brush-type element 104 for moving or brushing away dirt and debris ahead of pipe plug pig 10. In using sealing element 62, any leakage past plugging head 20 or 21 is forced out through a port 94 and fitting 92. If using cleaning element 102, any leakage past plugging head 20 is forced out through port 94 and fitting 92.

A skid plate 37 may replace guide wheel 36 on plugging heads 20 and 21. Skid plate 37 is mounted opposite wheel 34 on the angular surface of nose 28. The skid plate 37 may be constructed of suitable materials ranging from thermoplastic to brass. As pipe plug 10 is lowered into the access connection to pipe P, skid plate 37 comes into contact with and slideably engages the interior surfaces of the access connection, thereby preventing yoke 14 and plugging head 20 and 21 from becoming entrapped.

Similarly, a skid plate 87 may replace wheel 86 on plugging head 60. Skid plate 87 is mounted on an angular surface of nose 68 and opposite pivot arm 72. The skid plate 87 may be constructed of suitable materials ranging from thermoplastic to brass. As pipe plug 10 starts its entry into pipe P, skid plate 87 comes into contact with and slideably engages a bottom portion of pipe P. As skid plate 87 impinges on the bottom portion of the pipe P, plugging head 21, and then plugging head 20, begins its entry into pipe P. At some point in this process of rotating plugging head 60, pivot arm wheel 74 impinges on a top portion of pipe P and causes pivot arm 72 to rotate out of the way. The plugging heads 20, 21, and 60 then become oriented into their final sealing positions in a manner similar to that previously described.

Referring now to FIGS. 11 to 13B, pipe plug 10 may include inflatable sealing elements 23 and 63 on plugging heads 20 and 60, respectively. Alternatively, an arrangement similar to that shown in FIGS. 9 and 10 may be employed, with one or more heads 20, 21, and 60 having inflatable sealing elements. Sealing elements 23 and 63 are in communication with an inflation system 110. Inflation system 110 preferably includes one or more liquid or gas medium inflation sources 112 and 113. Inflation sources 112 and 113 may be a compressor, a compressed gas tank or a pump. Two passageways 120 and 160 connect the inflation sources 112 and 113 respectively to the sealing elements 23 and 63, and a third passageway 190 provides a bleed port. Valves 115 and 117 provide a means of isolating and controlling the inflation pressure provided by inflation sources 112 and 113, respectively. Valve 116 provides a means of controlling any leakage out of the bleed port.

As described below, each passageway 120, 160, and 190 includes various fittings and connectors, with some portions of the passageways 120, 160, and 190 passing through elements of pipe plug 10. For ease of description and reference, various sections of each passageway 120, 160, and 190 have been given letter designations. For example, 120A refers to an external supply line of passageway 120.

After pipe plug 10 has been properly oriented within pipe P, inflatable sealing elements 23 and 63 are inflated, either in concert or in series, so that they come into contact with and sealably engage an interior surface of pipe P. Inflation sources 112 and 113 provide an inflation medium, preferably air, an inert gas, or a liquid to sealing elements 23 and 63 by way of passageways 120 and 160. Passageway 190 provides a bleed port. Depending on the pipeline product, the bleed port may vent to a reservoir (not shown) or to ambient.

Considering inflation passageway 120 first, a supply line section 120A runs from inflation source 112 through valve 115 and tee 181 to bulkhead fitting 122 located on an external surface of housing H. Tee 181 is in communication with a bleed valve 119 and a vent. Fitting 122 is in communication with an elbow connector 124 that connects to the upper end of tubular section 120B. Tubular section 120B is preferably a steel tube in the shape of a compression spring. The lower end of tubular section 120B connects to a fitting 126 on carrier 12. Internal to carrier 12 is passageway section 120C. Passageway section 120C is constructed so that it aligns with one of the annular grooves 17 in yoke pin 16. O-rings 19, which are located on either side of the annular groove 17, provide sealing engagement and help to maintain the integrity of passageway 120 as it enters yoke pin 16.

Within yoke pin 16 is passageway section 120D. Because of the physical arrangement of carrier 12, yoke 14, and plugging head 20, passageway section 120D makes two angular jogs as it passes through yoke pin 16. Each angular jog is preferably a right angle jog. Fabricating one of the angular jogs in yoke pin 16 requires drilling into an end of yoke pin 16 and creating a longitudinal run 128. A plug 13 seals the exposed open end of the longitudinal run 128 and maintains the integrity of passageway 120 as it passes through yoke pin 16. A longitudinal run 130, which intersects lateral run 128, is in alignment with a second annular groove 17. Passageway section 120D exits yoke pin 16 and enters yoke 14 as passageway 120E.

An end plate 15 helps to secure yoke pin 16 into its proper position and ensure that the annular grooves 17 are in proper alignment with passageway sections 120C, 120D, and 120E. Passageway section 120E passes through a portion of yoke 14 and into plugging head 20, where passageway section 120E makes an angular jog and engages an inlet 25 of sealing element 23. Because of the above described arrangement and continuity of passageway 120, an inflation medium may pass from inflation source 112 to sealing element 23, thereby inflating sealing element 23. Prior to removing pipe plug 10 from the pipe, sealing element 23 may be deflated by opening bleed valve 119, which is connected to tee 181 on passageway section 120A.

Inflation passageway 160 may be constructed in a manner similar to inflation passageway 120. In a preferred embodiment, a supply line section 160A runs from inflation source 113 through valve 117 and tee 180 to bullhead fitting 162, which is in communication with an elbow connector 164. Tee 180 is in communication with a bleed valve 118 and a vent. Elbow connector 164 connects to the upper end of tubular section 160B. Tubular section 160B is preferably a steel tube in the shape of a compression spring and formed relative to tubular section 120B. Tubular section 160B, together with sections 120B and 190B, form a spring-like tube bundle 114. The lower end of tubular section 160B connects to a fitting 166 on carrier 12.

Internal to carrier 12 is passageway section 160C. Similar to passageway section 120C, passageway section 160C is constructed so that it aligns with one of the annular grooves 17 in yoke pin 16. O-rings 19 provide sealing engagement for the passageway 120 has it passes through annular groove 17. Within yoke pin 16 is passageway section 160D. As was the case with passageway section 120D, passageway section 160D makes two angular jogs as it passes through yoke pin 16. Each angular jog is preferably a right angle jog. A plug 13 seals the exposed open end of the lateral run 168 and maintains the integrity of passageway 160 as it passes through yoke pin 16.

As passageway section 160D exits yoke pin 16 it aligns with a second annular groove 17. The annular groove 17 provides continuity between passageway sections 160D and 160E. Passageway section 160E then passes through a portion of yoke 14 and nose 28 of plugging head 20. Because of the physical relationship between yolk 14 and nose 28, passageway section 160E makes two angular jogs as it travels toward sealing element 63. Again, these angular jogs, as with all the angular jogs described herein, are preferably right angle jogs. Annular groove 141 and O-rings 143 provide continuity of passageway section 160E between plugging head 20 and yoke 28. The annular groove 141 is located in a cylindrical portion connected to nose 28.

Passageway section 160E exits plugging head 20 and aligns with an annular groove 41 in yoke pin 40. O-rings 43 provide a seal for the annular groove 41. Passageway 160 then continues through yoke pin 40 as passageway section 160F. Passageway section 160F is constructed in a manner similar to passageway sections 120D and 160D. A plug 45 seals the lateral run 170. As passageway section 160F exits yoke pin 40 it aligns with a second annular grove 41 and enters yoke 38 as passageway section 160G. An end plate 39 helps secure and position yoke pin 40 so that the annular grooves 41 are in their proper alignment with passageway sections 160F and 160G. Passageway section 160G enters plugging head 60 and makes an angular jog to engage inlet 65 of sealing element 63.

Because of the above described arrangement and continuity of passageway 160, an inflation medium may pass from inflation source 113 to sealing element 63, thereby inflating sealing element 63. Prior to removing pipe plug 10 from the pipe, sealing element 63 may be deflated by opening bleed valve 118, which is connected to tee 180 on passageway section 160A.

Bleed port passageway 190 has a vent line section 190A and a tubular section 190B. Vent line portion 190A runs from bulkhead fitting 192 located on an external surface of housing H to bleed valve 116. Fitting 192 is in communication with an elbow connector 194 that connects to the upper end of tubular section 190B. Tubular section 190B is preferably a steel tube in the shape of a compression spring. The lower end of tubular section 190B connects to a fitting 196 on carrier 12. Internal to carrier 12 is passageway section 190C. Passageway section 190C is constructed so that it aligns with one of the annular grooves 17 in yoke pin 16.

Within yoke pin 16 is passageway section 190D, which makes two angular jogs as it passes through yoke pin 16. A plug 13 seals the exposed open end of the longitudinal run. Similar to passageway sections 120D and 160D, passageway section 190D aligns with a second annular groove 17 and enters yoke 14 as passageway section 190E. Passageway section 190E passes through a portion of yoke 14 and into plugging head 20 so that its open end 198 is exposed to the interior space between plugging heads 20 and 60. Any leakage past plugging head 20 is vented by passageway 190 through its open end 198.

Figure 14:
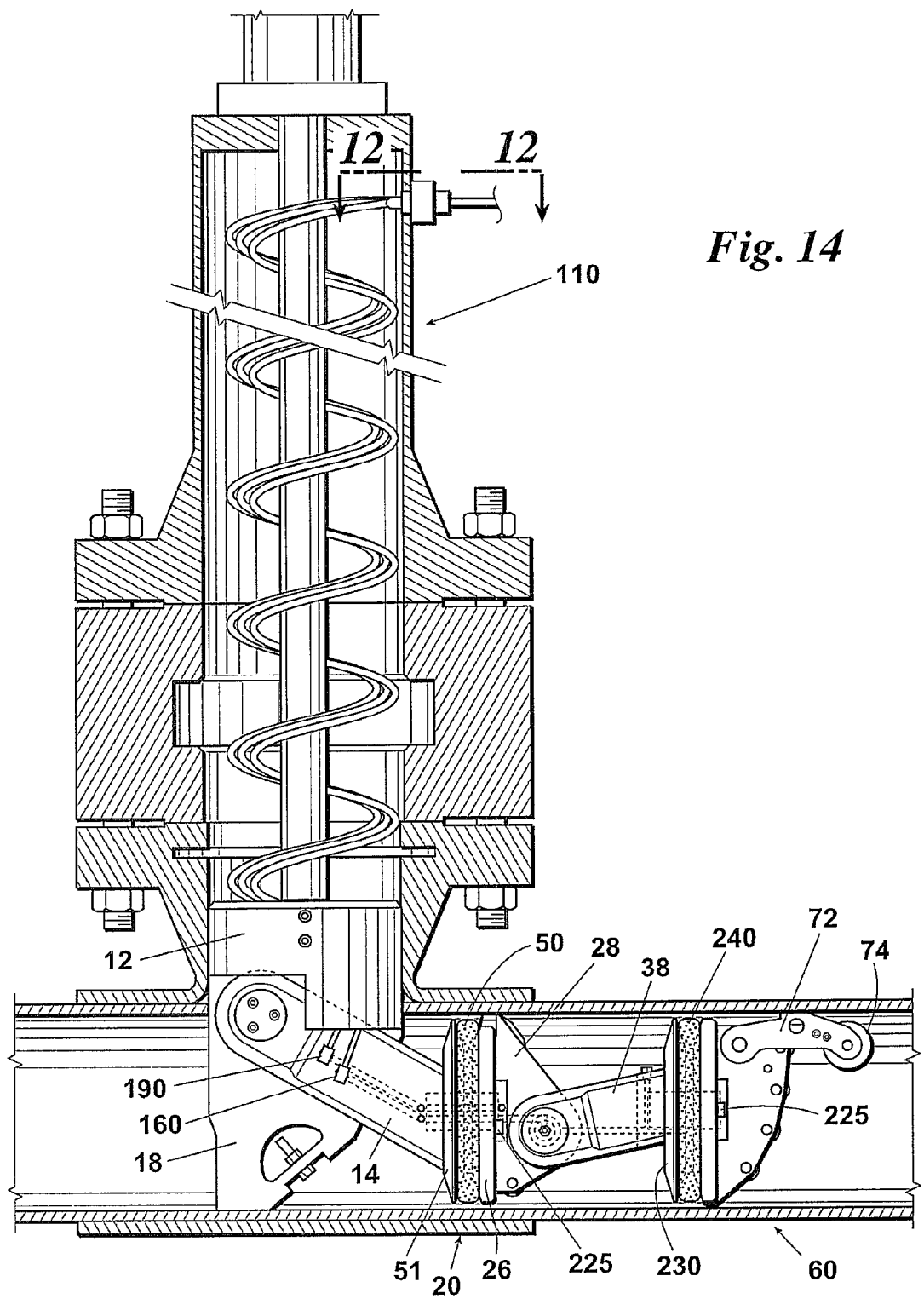
FIG. 14 is a view of a pipe plug having two plugging heads with compression packer sealing elements. A bundle of steel tubes forms part of two passageways that each supply hydraulic fluid used to actuate the sealing elements. A third passageway provides a bleed port.
Figure 15:
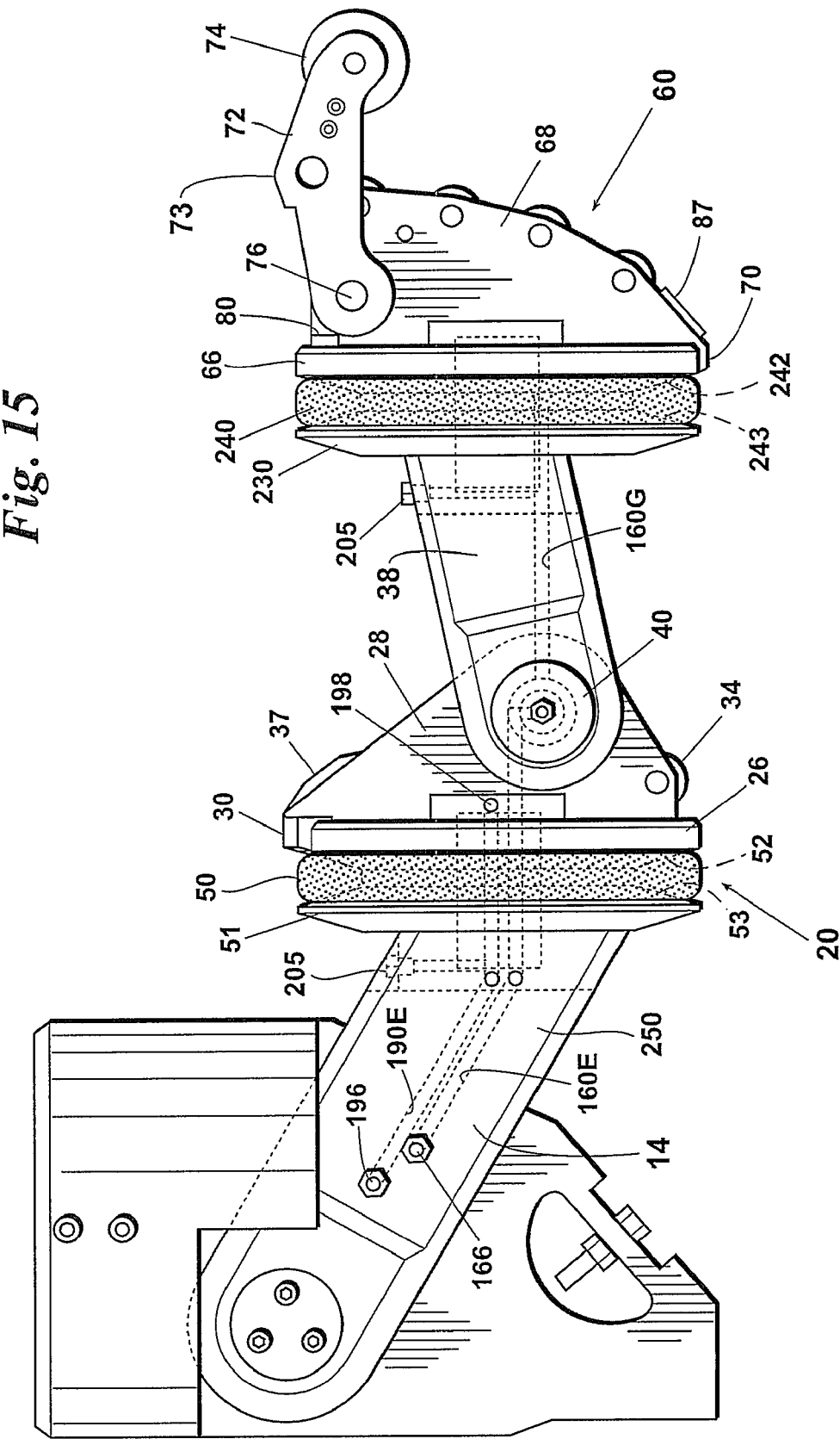
FIG. 15 is a view of the pipe plug as it would appear in a ready-to-seal position within a pipe (not shown). Each packer sealing element resides between a moveable piston plate and a fixed nose. The piston plate and nose protect the sealing elements during installation and removal.

Referring now to FIGS. 14 and 15, plugging heads 20 and 60 may each include a compression packer seal design having a packer seal 50, 240 in communication with a hydraulic fluid system 110. Packer seals work over a wider range of pipe inner diameters than standard sealing elements because standard sealing elements are ground for the actual pipe inner diameter. The packer seal design embodiment of pipe plug 10 orients itself in a sealing position within pipe P in a substantially similar manner as the standard seal design (FIGS. 1 to 10) and inflatable seal designs (FIGS. 11 to 13) and shares many of the components of those designs. For example, pipe plug 10 includes a carrier 12, yokes 14 and 38, yoke pins 16 and 40—which may have a different physical configuration than the carrier 12, yokes 14, 38 and yoke pins 16, 40 used in the standard and inflatable seal designs—, nose 28 and 68, skid plates 37 and 87, wheels 34, pivot arm 72, pivot arm wheel 74, pivot arm pin 76, spring 78, passageways 120, 160 and 190, and assorted hydraulic fittings. Each nose 28, 68 includes a stabilization pad 30, 70 to resist rotational loads and rotation about the respective yoke pin 16, 40 as previously described. The use of a standard control bar head to resist the pressure loads generated by the pipeline pressure does not place the major bending loads into the fitting F. This is accomplished by reacting bending load forces through the foot of yoke mount 18 against the bottom of pipe P and through carrier 12 against the access hole in pipe P.

In a preferred embodiment, plugging heads 20 and 60 are inserted into a pipe P with the packer seals 50 and 240 in a retracted or relaxed position. In the relaxed position, the outer diameters of the packer seals 50, 240 are typically smaller than the inner diameter of the pipe P. Subsequently, packer seal 50 is compressed between two angled surfaces 52 and 53 formed by fixed nosepiece 26 and a movable piston plate 51, respectively, on plugging head 20. Similarly, packer seal 240 is compressed between two angled surfaces 242 and 243 formed by fixed nosepiece 66 and a movable piston plate 230, respectively, on plugging head 60. The packer seal 50, 240 is compressed and forced outwardly in a radial direction to impinge the interior wall surface of pipe P and create a barrier.

Plugging head 20 is the primary sealing mechanism and plugging head 60 is the secondary sealing mechanism. The position of the two packer seals 50, 240 downstream from the access opening to pipe P, enables the pipeline product to be routed through a port in the side of the housing H and provides a means of bypassing product flow around pipe plug 10 and the work that is being done to pipe P. As in other embodiments described herein, one or more additional plugging heads 21 may be employed in combination with plugging heads 20 and 60 (see e.g. FIGS. 9 and 10). Alternatively, one plugging head 20 or 60 may be employed as a single plugger but this single plugger would not provide the double block and bleed redundancy and safety that two or more plugging heads 20, 60 provide.

Figure 16:
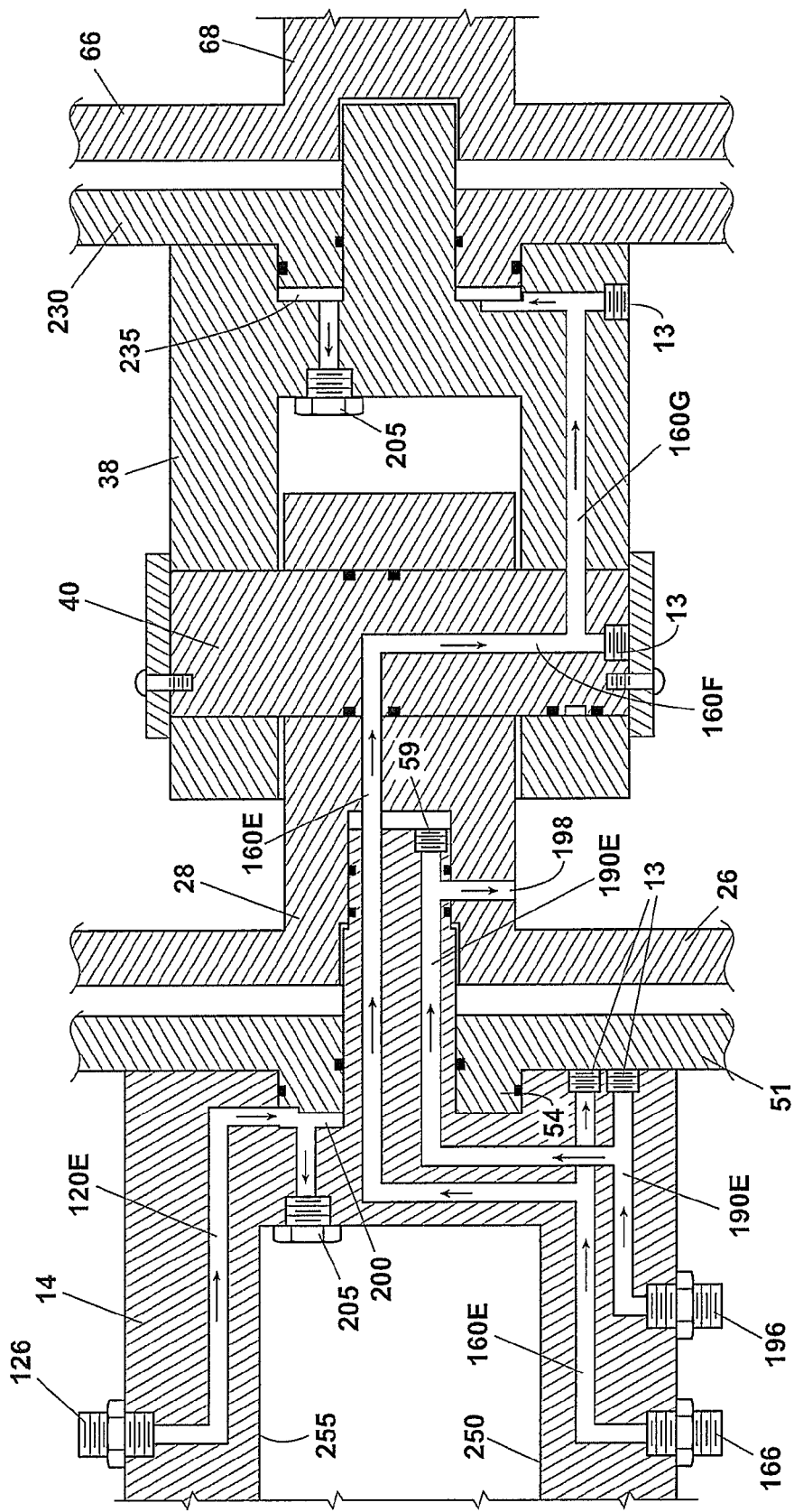
FIG. 16 is a plumbing schematic for the pipe plug when equipped with packer sealing elements. Two independent passageways each provide hydraulic fluid to one of the two plugging heads. Each passageway provides means of hydraulically pressurizing a cylindrical cavity in communication the movable piston plate.
Figure 17:
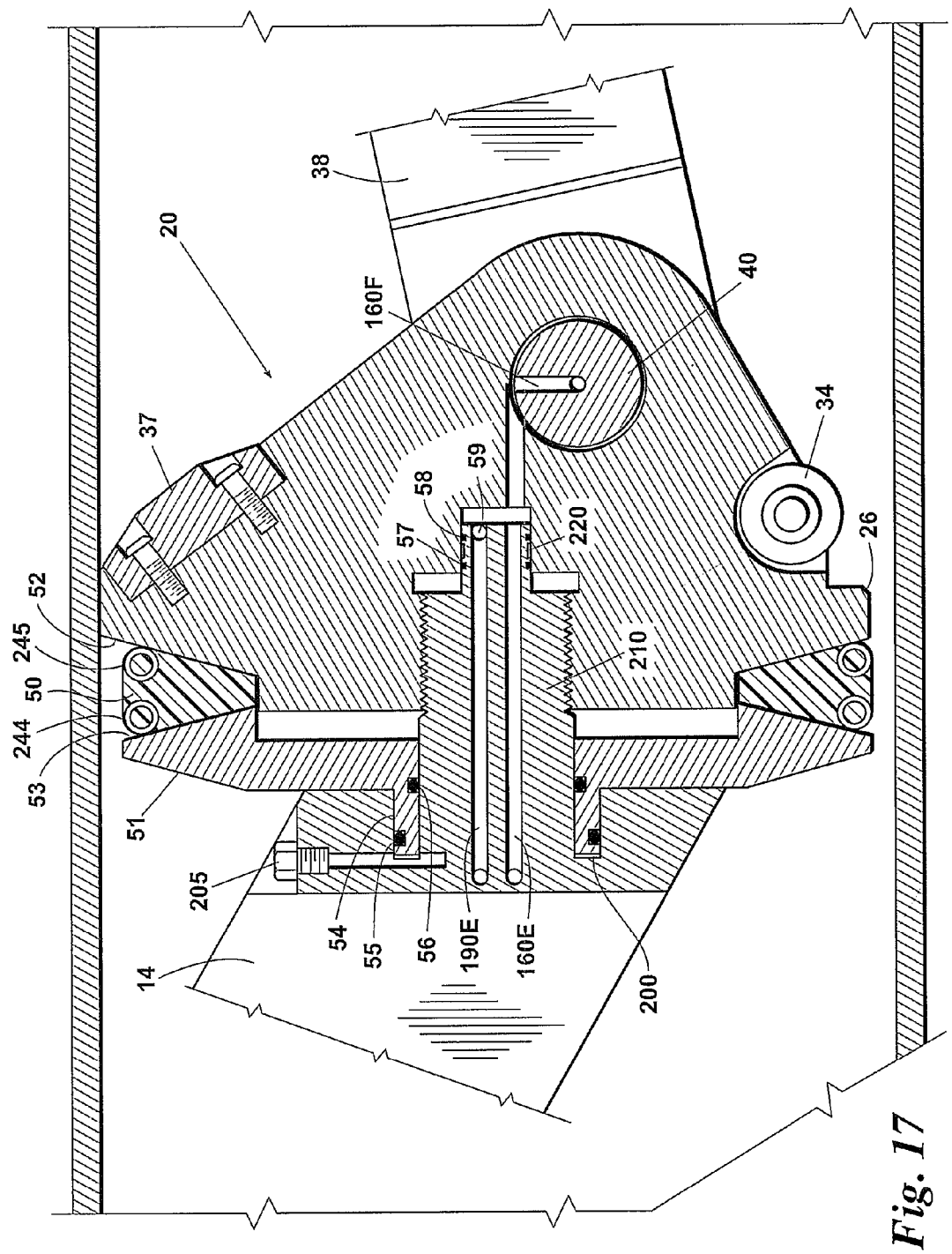
FIG. 17 is a cross-sectional view of the trailing plugging head with the packer seal in a retracted position. The packer seal has two anti-extrusion springs. The movable piston plate has a cylindrical protrusion that enables the piston plate to act in a manner similar to a hydraulic cylinder rod.
Figure 18:
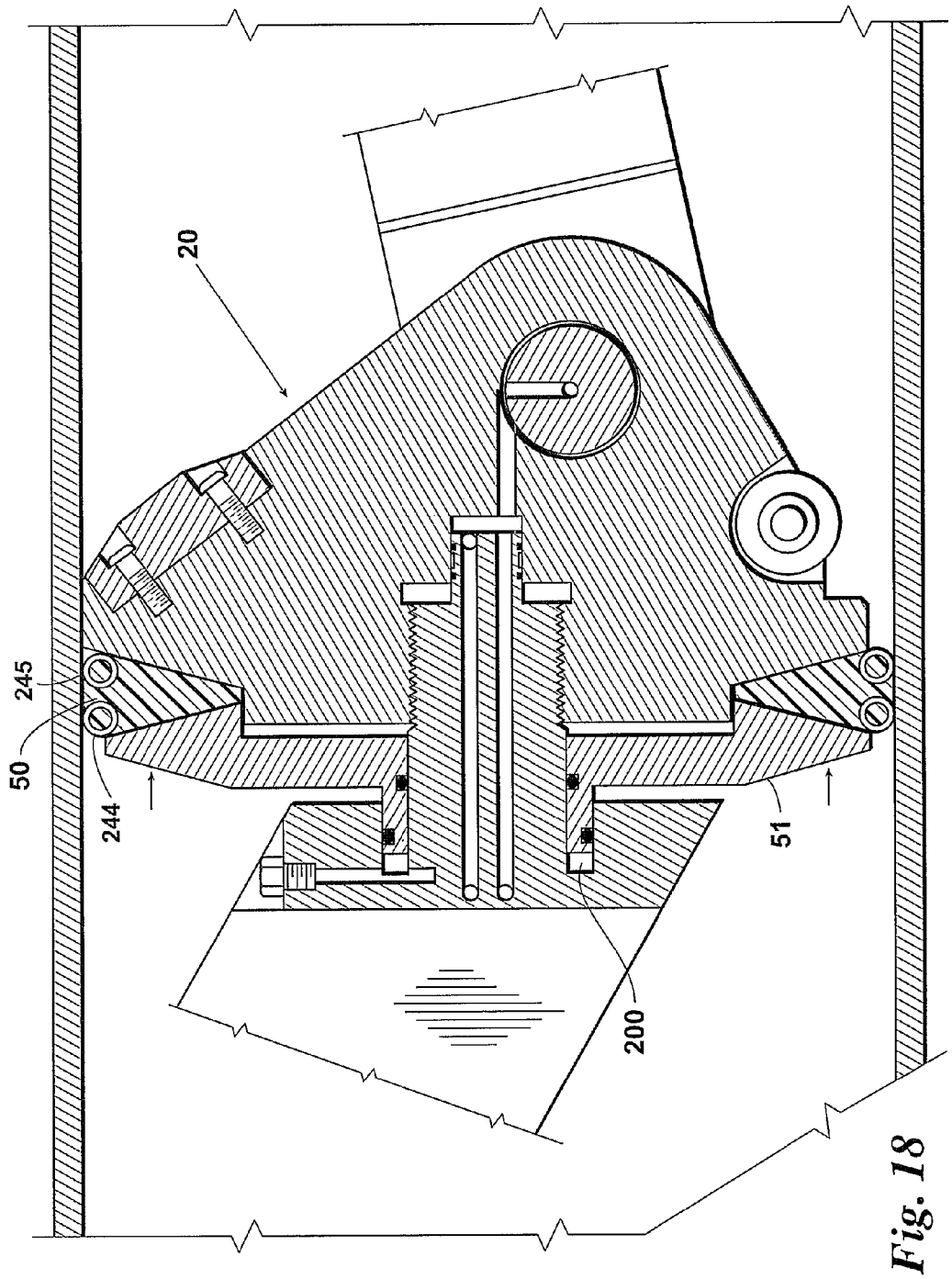
FIG. 18 is a cross-sectional view of the trailing plugging head with the packer seal in an expanded position.

As illustrated in FIGS. 17 and 18, piston plate 51 on plugging head 20 is designed with a cylindrical protrusion 54 having two grooves to accept O-rings 55 and 56 (or other similar seals which are well-known in the art). The purpose of cylindrical protrusion 54 is to enable piston plate 51 to act in a manner similar to a hydraulic cylinder rod. The cylindrical protrusion 54, with O-rings 55 and 56, slips inside a cylindrical cavity 200 in the end of yoke 14 and thus completes the design of a basic, single-acting, hydraulic cylinder. As illustrated in FIG. 16, yoke 14 has internal passageways 120, 160 and 190 to provide means of hydraulically pressurizing cylindrical cavity 200 as well as vent 198. Passageways 120, 160 and 190 may be routed to yoke 14 in a manner substantially similar to that as previously described. A plug 59 seals the end of passageway section 190E.

Once the pipe plug 10 is set into its final sealing position in pipe P, piston plate 51 is hydraulically pressurized and caused to move against packer seal 50. Packer seal 50 is preferably an elastomeric seal that is compliant to the wall of pipe P. Packer seal 50 has two anti-extrusion springs 244 and 245. Hydraulic fluid is pumped into cylindrical cavity 200 located at the end of passageway section 120E in yoke 14 and pushes piston plate 51 against packer seal 50. The packer seal 50 is compressed against the angled surface 52 of the nosepiece 26. As the piston plate 51 pushes against the packer seal 50, the angled surface 53 of the piston plate 51 and angled surface 52 of nosepiece 26 distort the packer seal 50 and cause it to distend in an outwardly radial direction until it impinges the wall of pipe P. Anti-extrusion springs 244 and 245 prevent the elastomer from extruding between the pipe P and piston plate 51 and nosepiece 26. Thus packer seal 50 creates a barrier within pipe P.

Figure 19:
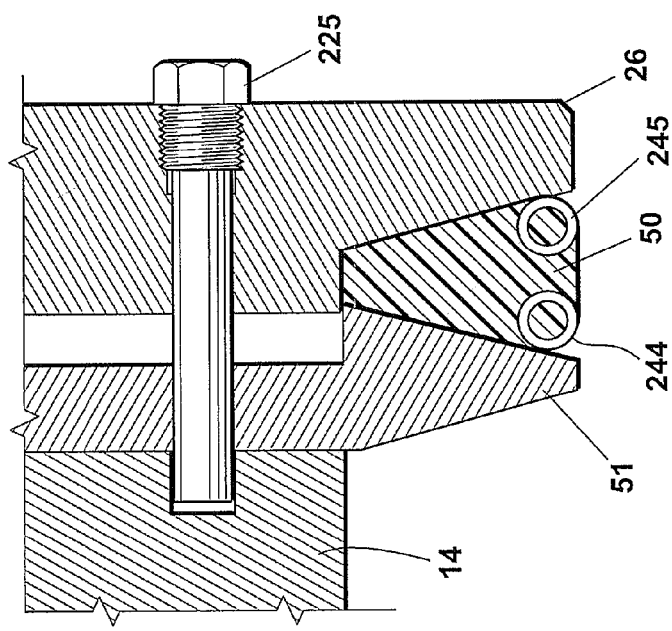
FIG. 19 is a partial cross-sectional view of the trailing plugging head. The plugging head is held in its correct orientation by an anti-rotation pin that threads into the nosepiece, piston plate and yoke.

Referring now to FIG. 19, plugging head 20 is held in its correct orientation relative to yoke 14 by way of nosepiece 26 and anti-rotation pin 225. Nosepiece 26 is threaded onto a threaded shaft 210 which is part of yoke 14. An anti-rotation pin 225, which is threaded and sealed into nosepiece 26, is then used to properly orient nose 28 relative to yoke 14. The seal between anti-rotation pin 225 and nosepiece 26 may be a pipe thread, an O-ring 57, 58 (see FIG. 17) or other seal well-known in the art. Anti-rotation pin 225 passes through a hole in nosepiece 26, through a hole in piston plate 51 and into a hole in yoke 14, thereby being maintained in proper orientation to each other.

Figure 11:
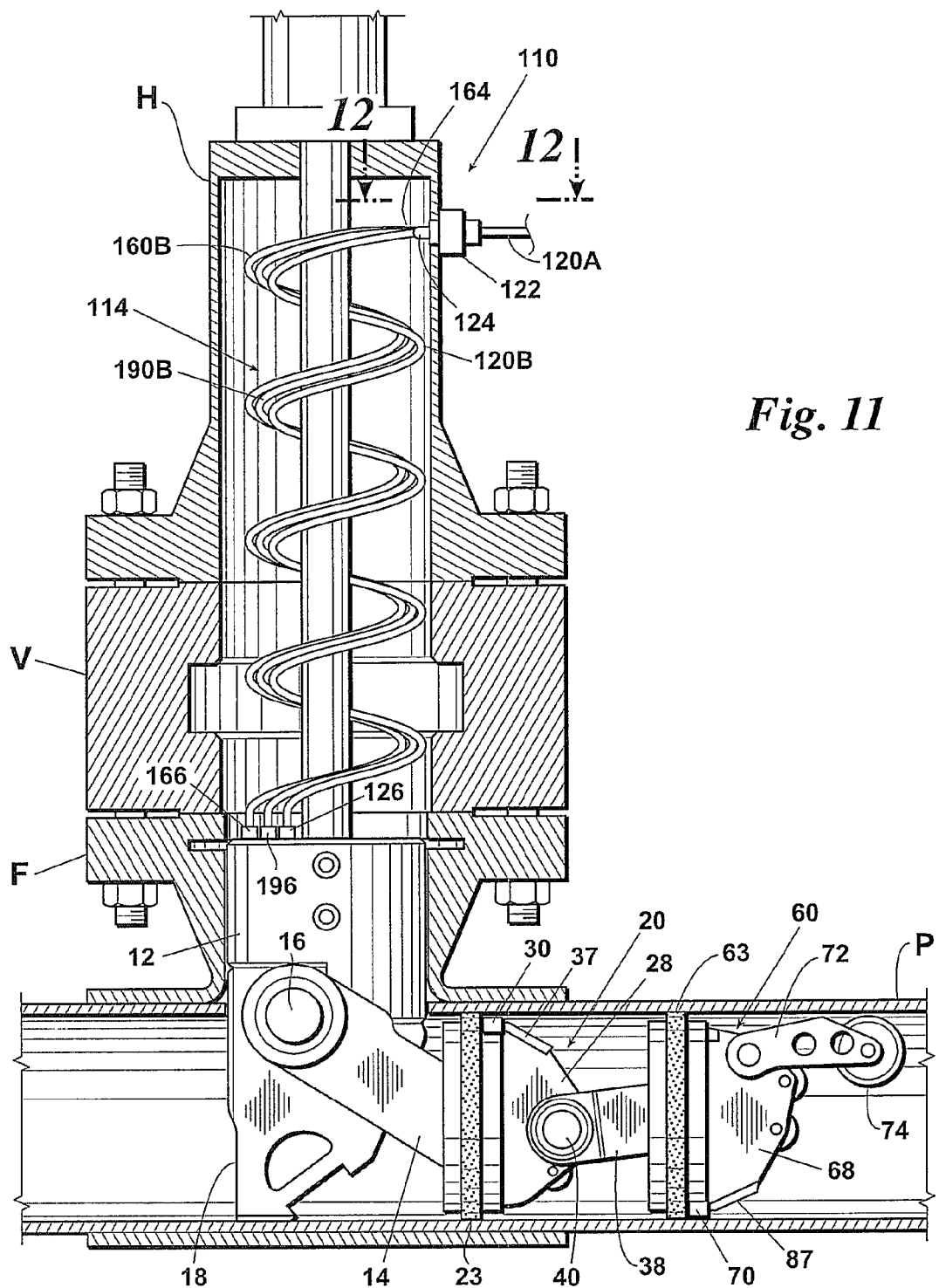
FIG. 11 is a view of the pipe plug having two plugging heads with inflatable sealing elements. A bundle of steel tubes forms part of two passageways that each supply a source of inflation to one of the sealing elements. A third passageway provides a bleed port.
Figure 12:
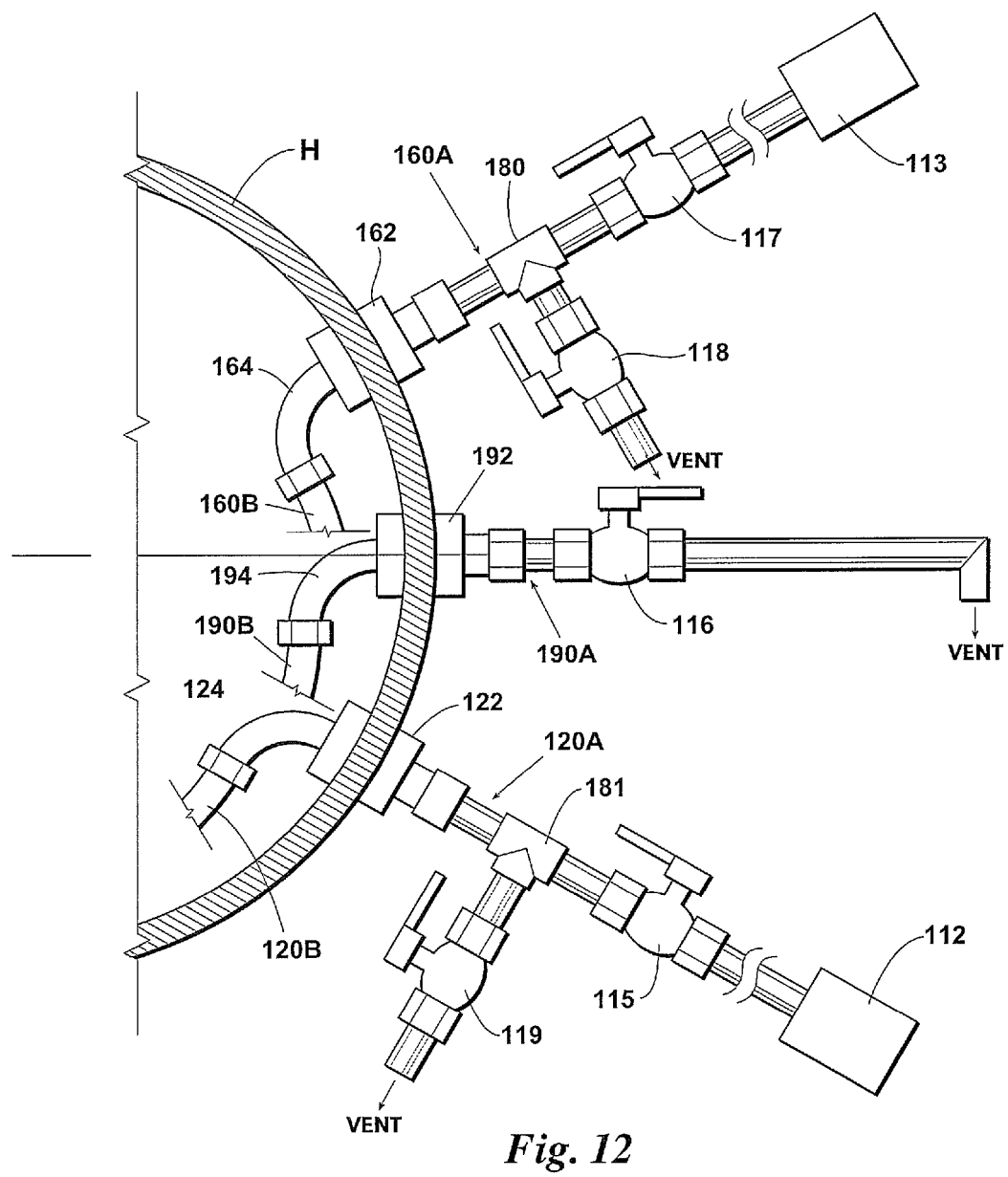
FIG. 12 is a view taken along section line 12-12 of FIG. 11. Bulkhead fittings connect the supply line portions of the passageways with the steel tube portion of the passageways located within the housing.
Figure 13A:
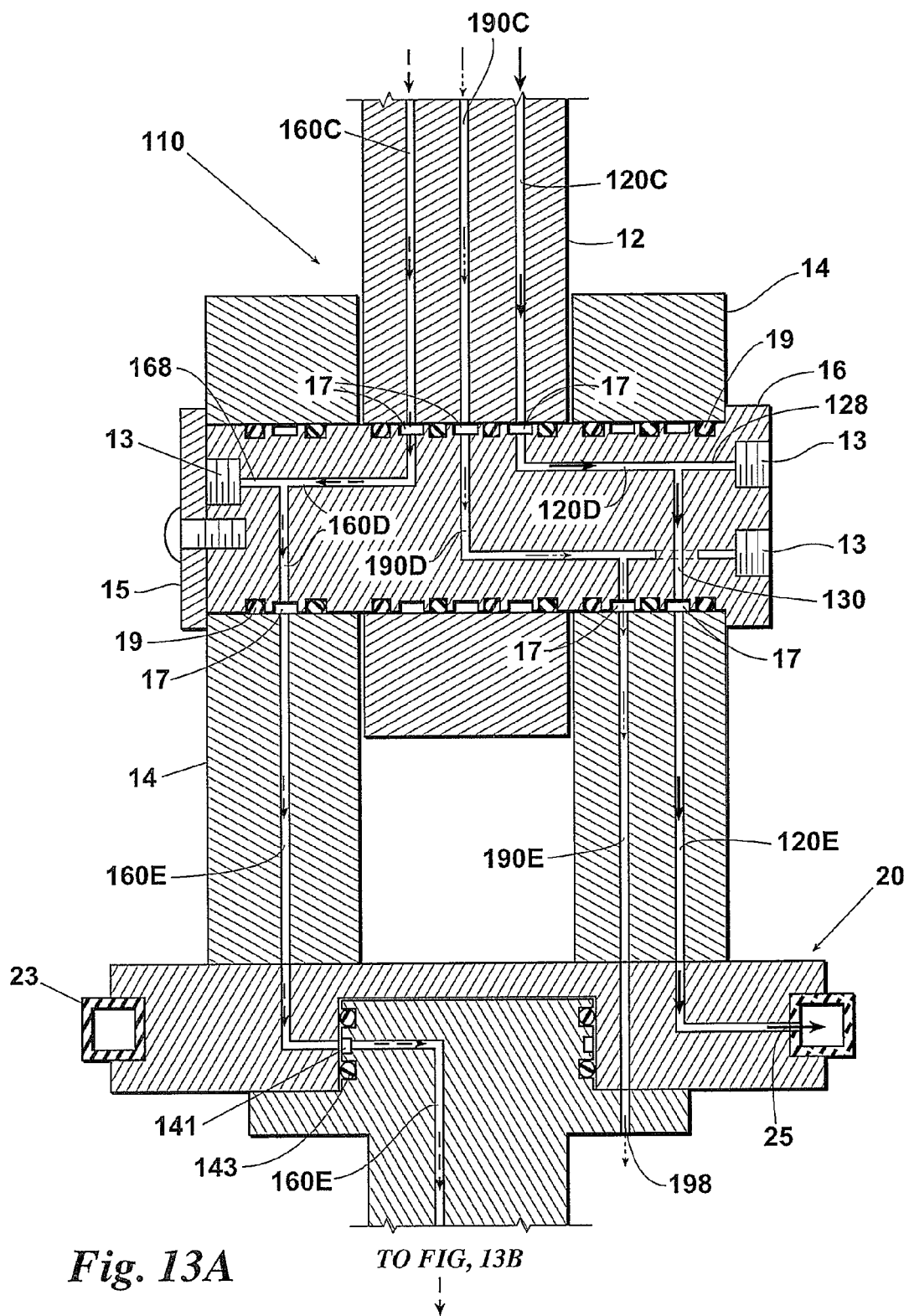
FIGS. 13A and 13B are plumbing schematics for the pipe plug when equipped with inflatable sealing elements. The passageways pass through various portions of the pipe plug in order to supply an inflation medium to the inflatable sealing elements and provide a bleed port.
Figure 13B:
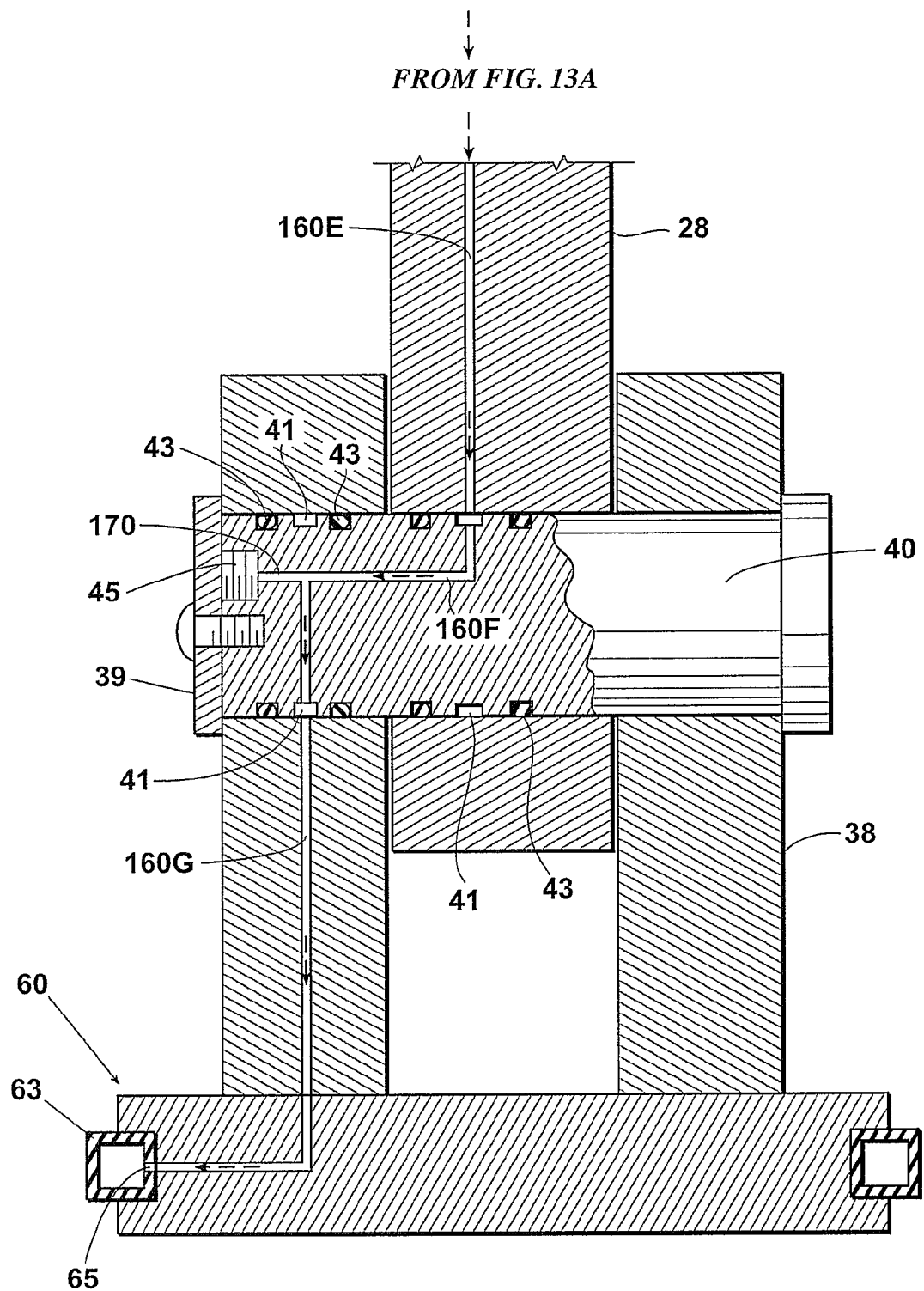
Figure 20:
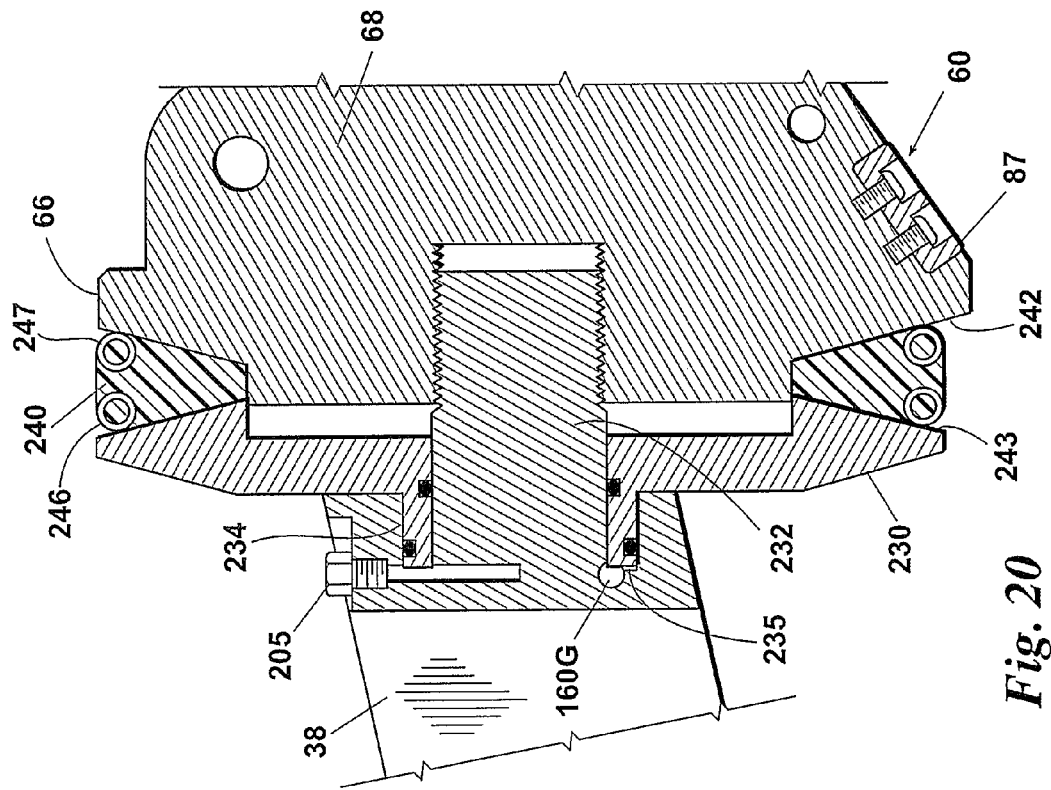
FIG. 20 is a partial-cross sectional view of the leading plugging head.

Referring now to FIG. 20, plugging head 60 is very similar to plugging head 20 but does not have the same hydraulic porting. Only passageway 160 travels through yoke 38 (see FIG. 16). Passageway 160 provides means of hydraulically pressurizing a cylindrical cavity 235 in communication with piston plate 230. A cylindrical protrusion 234 on piston plate 230 enables piston plate 230 to act in a manner similar to a hydraulic cylinder rod. Because of the separate porting arrangement to plugging head 60, packing seal 240 is actuated independently of packing seal 50. This provides a redundant system which is inherently safer than a system which relies upon a single fluid circuit to actuate two or more seals. The failure of one hydraulic system 120, 160, therefore, does not cause pipe plug 10 to lose all sealing integrity within pipe P. This redundancy is also a feature of the inflatable seal designs (FIGS. 11 to 13)

Once the pipe plug 10 is set into its final sealing position in pipe P, piston plate 230 is hydraulically pressurized and caused to move against packer seal 240. Similar to packer seal 50, packer seal 240 is preferably an elastomeric seal that is compliant to the wall of pipe P. Packer seal 240 has two anti-extrusion springs 246 and 247 that serve a similar purpose as springs 244 and 245 (described previously). Hydraulic fluid is pumped into cylindrical cavity 235 located at the end of passageway section 160G in yoke 38 and pushes piston plate 230 against packer seal 240. The packer seal 240 is compressed against the angled surface 242 of the nosepiece 66. Nosepiece 66 is threaded onto a threaded shaft 232. Nose 68 is held in its correct orientation relative to yoke 38 in a manner similar to that as described for nose 28. As the piston plate 230 pushes against the packer seal 240, the angled surface 243 of the piston plate 240 and angled surface 242 of nosepiece 66 distort the packer seal 240 and cause it to distend in an outwardly radial direction until it impinges the wall of the pipe. Thus packer seal 240 creates a barrier when pipe plug 10 is set within the pipe.

The loads exerted by skid plates 37, 87 against the bores of the housing H, valve V and fitting F should be reduced during installation and retraction of the plugging heads 20, 60. The reduced loads are due to the packer seals 50, 240 being encased between two steel members 26, 51 and 66, 230, respectively and not exposed to the bores as are the standard sealing elements (e.g. sealing element 22). The standard sealing elements are deformed by the aforementioned bores during the installation and retraction process, thus causing reaction loads on the skid plates 37, 87. Because the packer seals 50, 240 are protected, each may be re-used in subsequent plugging applications.

Figure 21:
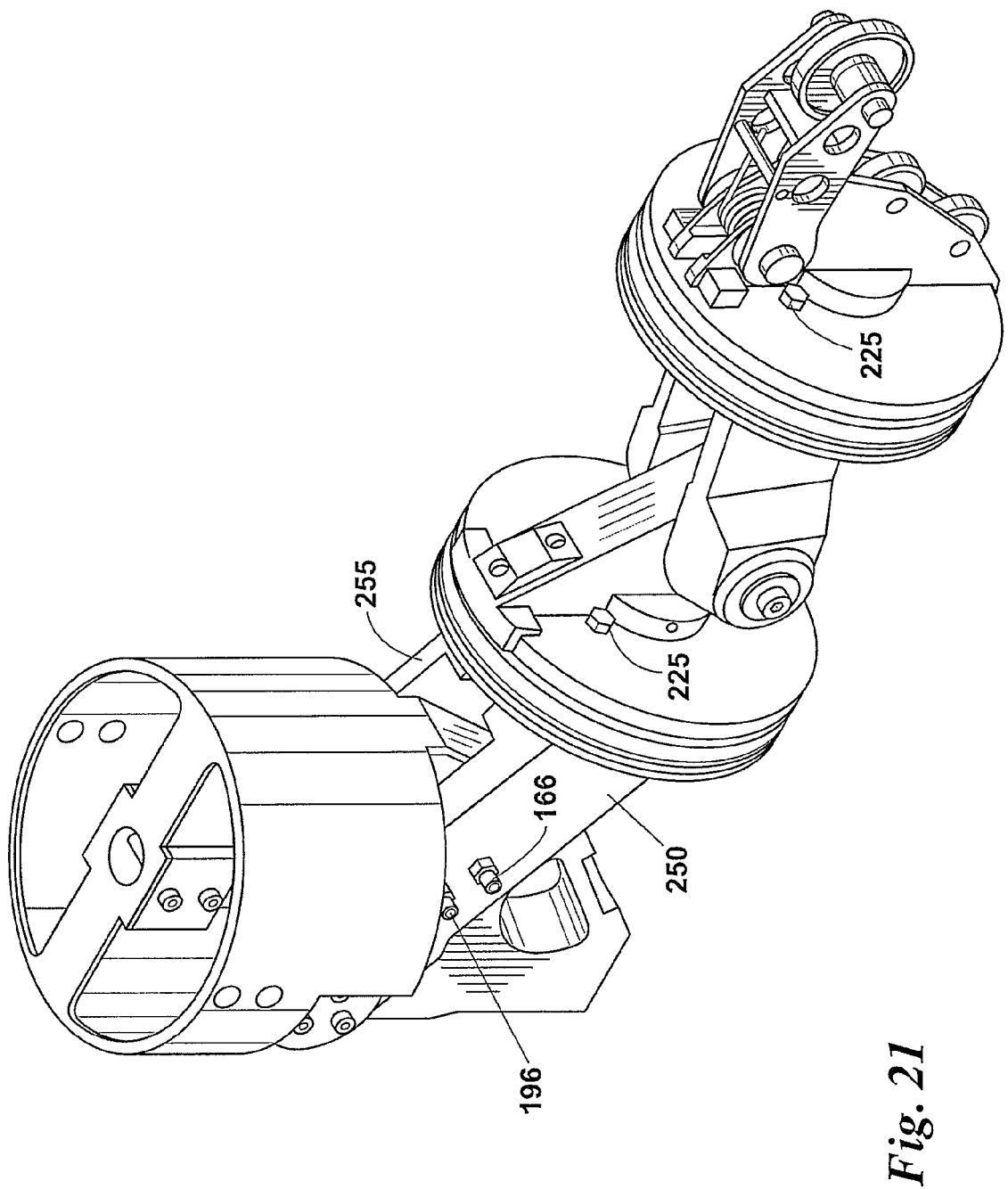
FIG. 21 is an isometric view of the pipe plug illustrating an alternate porting arrangement that does not include drilling the yoke pin to act as a conduit as previously shown in FIG. 13A. Instead, the yoke arm includes fittings that are in communication with the inflation passageways and bleed passageway.
Figure 22:
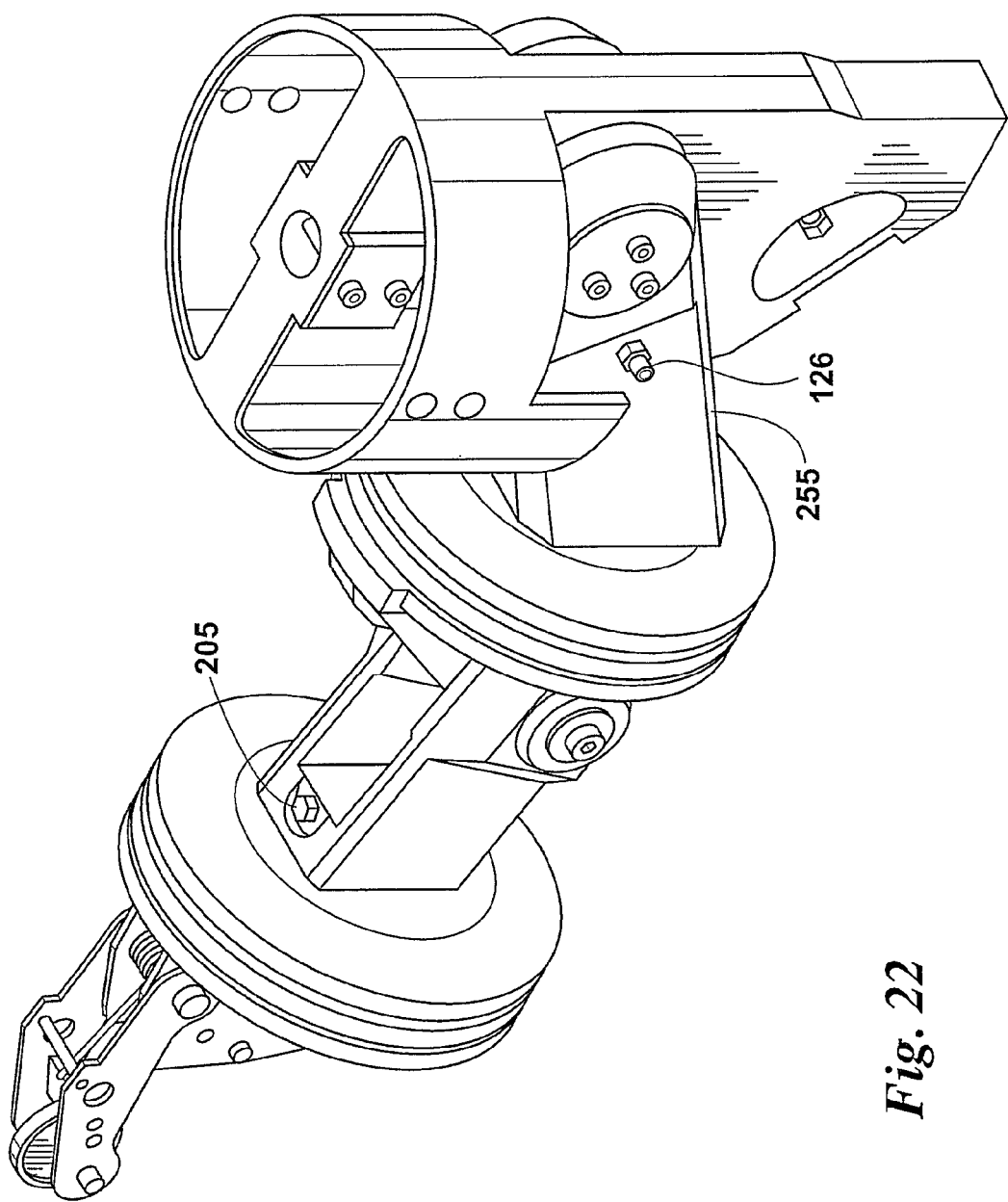
FIG. 22 is a reverse isometric view the pipe plug illustrating the alternate porting arrangement.

Referring now to FIGS. 21 and 22, the fluid circuit design for use with inflatable seals or packer seals can be done many different ways by someone skilled in the art. For example, hydraulic hoses (not shown) may be used instead of porting through the yokes 14, 38. A preferred embodiment—which does not include drilling yoke pin 16 to act as a conduit as previously shown in FIG. 13A—includes machining yoke arm 250 to accept fittings 166 and 196. Yoke arm 255 is machined to accept fitting 126. Bleed fittings 205 are provided to bleed air out of cylindrical cavities 200 and 235 (see also FIGS. 17 and 20).

While an improved double block and bleed plug has been described with a certain degree of particularity, many changes may be made in the details of construction and the arrangement of components without departing from the spirit and scope of this disclosure. It is understood that an improved double block and bleed plug is not limited to the embodiments set forth herein for purposes of exemplification, but is to be limited only by the scope of the attached claims, including the full range of equivalency to which each element thereof is entitled.

What is claimed is:

1. A pipe plug for temporarily plugging a pipe, said pipe plug comprising:
    a carrier having a pivotal connection to a trailing plugging head in a plurality of plugging heads;
    each head in the plurality of plugging heads having a pivotal connection one to the other, at least one plugging head in said plurality of plugging heads having an expandable sealing element; and
    a fluid circuit in communication with said expandable sealing element;
    a fluid provided by said fluid circuit causing said expandable sealing element to move between a retracted position and an expanded position;
    each said pivotal connection permitting a respective plugging head in said plurality of plugging heads to rotate about a pivot point and traverse a right angle and enter an interior space of the pipe when at least a portion of one of said carrier and one plugging head in said plurality of plugging heads lies outside of the interior space of the pipe.

2. A pipe plug according to claim 1 further comprising said expandable sealing element being selected from the group consisting of an inflatable sealing element and a compression packer sealing element.

3. A pipe plug according to claim 1 further comprising said fluid circuit having a first passageway and a second passageway, said first passageway capable of carrying said fluid to a portion of said at least one plugging head, an open end of said second passageway being in communication with an interior space of the pipe when the pipe plug is in a sealing position.

4. A pipe plug according to claim 3 further comprising at least one of said first and second passageways passing through at least one of the pivotal connections.

5. A pipe plug according to claim 4 further comprising at least one said pivotal connection having an annular groove, said annular groove being in communication with at least one of said first and second passageways.

6. A pipe plug according to claim 3 further comprising a portion of at least one of said first and second passageways being a tubing.

7. A pipe plug according to claim 3 further comprising a piston plate in communication with said first passageway and said expandable sealing element, said piston plate being moveable between a first position and a second position, said expandable sealing element being located between said piston plate and a nosepiece of said at least one plugging head.

8. A pipe plug according to claim 7 further comprising said expandable sealing element including at least one anti-extrusion spring.

9. A pipe plug according to claim 7 further comprising an anti-rotation pin located on said at least one plugging head.

10. A pipe plug according to claim 1 further comprising a second plugging head in said plurality of plugging heads having a cleaning element.

11. A pipe plug according to claim 10 further comprising said cleaning element including a wire brush.

12. A pipe plug according to claim 1 further comprising a skid plate, said skid plate oriented to facilitate placement of said plurality of plugging heads within a pipe.

13. A pipe plug according to claim 1 further comprising a pivot arm, said pivot arm being located on a leading plugging head of said plurality of plugging heads.

14. A pipe plug for temporarily plugging a pipe, said pipe plug comprising:
    a carrier;
    a first plugging head, said first plugging head having a first circumferential sealing element and a first pivotal connection to said carrier, said first pivotal connection permitting said first plugging head to rotate relative to said carrier about a first pivot point and traverse a right angle to gain access to an interior space of a pipeline;
    a second plugging head, said second plugging head having a second circumferential sealing element and a second pivotal connection to said first plugging head, said second pivotal connection permitting said second plugging head to rotate relative to said first plugging head about a second pivot point and traverse a right angle to gain access to the interior space of the pipeline.

15. A pipe plug according to claim 14 further comprising an inflation system having a first and second passageway, said first and second passageways each capable of carrying an inflation medium to one of said first and second expandable sealing elements respectively.

16. A pipe plug according to claim 15 further comprising a piston plate in communication with said first passageway and said expandable sealing element, said piston plate being moveable between a first position and a second position, said expandable sealing element being located between said piston plate and a nosepiece of said at least one plugging head.

17. A pipe plug according to claim 16 further comprising said expandable sealing element including at least one anti-extrusion spring.

18. A pipe plug according to claim 15 further comprising a third passageway, an open end of said third passageway being located downstream of said first plugging head and in communication with an interior portion of a pipe.

19. A pipe plug according to claim 15 further comprising said first and second passageways passing through a portion of said first and second pivotal connections respectively.

20. A pipe plug according to claim 14 further comprising a third plugging head having a cleaning element and a third pivotal connection to said second plugging head.

21. A pipe plug according to claim 20 further comprising said cleaning element being a wire brush.

22. A pipe plug according to claim 20 further comprising said third plugging head having a skid plate, a guide wheel, and a pivot arm.

23. A pipe plug according to claim 14 further comprising said first plugging head and second plugging head each having a skid plate and a guide wheel, each said skid plate and said guide wheel oriented to facilitate placement of said first and second plugging heads respectively within a pipe.

24. A pipe plug according to claim 23 further comprising said second plugging head having a pivot arm.

25. A method of double-blocking a pipe, the method comprising the steps of:
    lowering a first plugging head and a second plugging head through a lateral pipe access connection, the heads being pivotally connected relative to one another, the first plugging head being pivotally connected relative to a carrier;
    rotating the first plugging head and the second plugging head about a respective pivotal connection as the carrier continues its downward travel through the lateral pipe access connection so that each plugging head enters a pipe connected to and lying non-parallel to the lateral pipe access connection; and positioning the first plugging head and the second plugging head into a final sealing position within the pipe; and sealably engaging an internal wall of the pipe with at least one of the first and second plugging heads.

26. A method of double-blocking a pipe according to claim 25 wherein at least one said step of rotating and positioning is by at least one skid plate that slideably engages an interior portion of at least one of the lateral pipe access connection and the pipe.

27. A method according to claim 25 further comprising the step of venting an interior space of the pipe through a bleed port, a portion of the bleed port being integral to at least one of the plugging heads.

28. A method according to claim 25 wherein the plugging head is an inflatable sealing element that is deflated through a bleed valve.

29. A pipe plug system for temporarily plugging a pipe, said pipe plug system comprising:
   a carrier;
   a leading plugging head; and
   a trailing plugging head;
   the trailing plugging head being connected to the carrier and rotating about a pivot point of the carrier;
   the leading plugging head being connected to the trailing plugging head and rotating about a pivot point of the trailing plugging head;
   the trailing and leading plugging heads being in rotational relationship to one another, the rotational relationship being such that during a linear travel of the carrier the leading and trailing plugging heads when in a non-sealing position rotate about their respective pivot points and assume different angular orientations with respect to each other.

* * * * *